(12) United States Patent
Dombrowski et al.

(10) Patent No.: US 10,283,952 B2
(45) Date of Patent: May 7, 2019

(54) RAPIDLY DEPLOYABLE FLOOR POWER SYSTEM

(71) Applicant: Bretford Manufacturing, Inc., Franklin Park, IL (US)

(72) Inventors: Mike Dombrowski, Elk Grove Village, IL (US); John Sadler, Des Plaines, IL (US); Cary Maguire, Chicago, IL (US); Patrick Eiswerth, Chicago, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 0 days.

(21) Appl. No.: 15/789,356

(22) Filed: Oct. 20, 2017

(65) Prior Publication Data

US 2018/0375317 A1    Dec. 27, 2018

Related U.S. Application Data

(60) Provisional application No. 62/523,560, filed on Jun. 22, 2017.

(51) Int. Cl.
*H02G 3/04* (2006.01)
*H02G 3/34* (2006.01)
(Continued)

(52) U.S. Cl.
CPC .......... *H02G 9/025* (2013.01); *H01R 13/6205* (2013.01); *H01R 25/142* (2013.01);
(Continued)

(58) Field of Classification Search
None
See application file for complete search history.

(56) References Cited

U.S. PATENT DOCUMENTS

| 645,576 A | 3/1900 | Nikola |
| 2,415,688 A | 2/1947 | Hall |

(Continued)

FOREIGN PATENT DOCUMENTS

| CA | 2716626 | 9/2009 |
| CH | 681121 | 1/1993 |

(Continued)

OTHER PUBLICATIONS

Written Opinion of the International Searching Authority from related International Application PCT/US2018/020378.

(Continued)

*Primary Examiner* — Dimary S Lopez Cruz
(74) *Attorney, Agent, or Firm* — Anderson Gorecki LLP

(57) ABSTRACT

A rapidly deployable floor power system includes a base unit for supplying low voltage DC power to one or more foldable power tracks. Each foldable power track has a set of rigid track sections with exposed track power contacts on a top surface. The rigid track sections are electrically and mechanically interconnected by flexible track connectors that enable the power track to be folded when the power track is to be moved or stored, and unfolded for rapid deployment in an area to be supplied with power. The rigid track sections lie approximately flush with the floor to minimize tripping potential. Magnetic connectors engage the track to obtain power from the track, and are used to electrically interconnect adjacent tracks. A power distribution unit supplies power via low voltage ports such as USB ports and/or via one or more power whips equipped with barrel jack tips.

39 Claims, 35 Drawing Sheets

(51) Int. Cl.
*H02G 9/02* (2006.01)
*H01R 13/62* (2006.01)
*H01R 25/14* (2006.01)
*H01R 35/02* (2006.01)
*H02G 3/00* (2006.01)
*H02J 1/06* (2006.01)

(52) U.S. Cl.
CPC ........... *H01R 25/145* (2013.01); *H01R 35/02* (2013.01); *H02G 3/00* (2013.01); *H02G 3/0475* (2013.01); *H02G 3/34* (2013.01); *H02J 1/06* (2013.01)

(56) References Cited

U.S. PATENT DOCUMENTS

| | | | |
|---|---|---|---|
| 3,521,216 A | 7/1970 | Tolegian | |
| 3,675,108 A | 7/1972 | Nicholl | |
| 3,739,317 A | 6/1973 | Wise | |
| 3,938,018 A | 2/1976 | Dahl | |
| 4,345,223 A | 8/1982 | Chien-Chun | |
| 4,347,472 A | 8/1982 | Lemelson | |
| 4,671,584 A | 6/1987 | Barkus et al. | |
| 4,739,242 A | 4/1988 | Mccarty et al. | |
| 4,875,871 A * | 10/1989 | Booty, Sr. ............ H01R 25/162 439/209 | |
| 4,919,625 A | 4/1990 | Coutre | |
| 4,984,982 A | 1/1991 | Brownlie et al. | |
| 5,024,614 A | 6/1991 | Dola et al. | |
| 5,152,698 A | 10/1992 | Juhlin et al. | |
| 5,154,509 A | 10/1992 | Wulfman et al. | |
| 5,397,238 A | 3/1995 | Och | |
| D358,803 S | 5/1995 | Shen | |
| 5,550,452 A | 8/1996 | Shirai et al. | |
| 5,600,225 A | 2/1997 | Goto | |
| 5,689,171 A | 11/1997 | Ludewig | |
| 5,734,253 A | 3/1998 | Brake et al. | |
| 5,773,954 A | 6/1998 | Vanhorn | |
| 5,780,773 A | 7/1998 | Wakamatsu | |
| 5,780,991 A | 7/1998 | Brake et al. | |
| 5,869,786 A | 2/1999 | Jaakkola et al. | |
| 5,900,586 A | 5/1999 | Carr | |
| 5,949,155 A | 7/1999 | Tamura et al. | |
| 5,952,814 A | 7/1999 | Van | |
| 5,959,433 A | 7/1999 | Rohde | |
| 5,963,012 A | 10/1999 | Garcia et al. | |
| 6,022,087 A | 2/2000 | Gilbert | |
| 6,028,267 A | 2/2000 | Byrne | |
| 6,040,680 A | 3/2000 | Toya et al. | |
| D429,695 S | 8/2000 | Henry | |
| 6,124,699 A | 9/2000 | Suzuki et al. | |
| 6,184,651 B1 | 2/2001 | Fernandez et al. | |
| 6,194,664 B1 | 2/2001 | Zamora et al. | |
| 6,204,632 B1 | 3/2001 | Nierescher et al. | |
| 6,234,812 B1 | 5/2001 | Ivers et al. | |
| 6,237,507 B1 | 5/2001 | Yanagisawa et al. | |
| D443,863 S | 6/2001 | Maccarone et al. | |
| 6,283,766 B1 | 9/2001 | Donnelly et al. | |
| 6,331,744 B1 | 12/2001 | Chen et al. | |
| 6,421,600 B1 | 7/2002 | Ross | |
| 6,424,248 B1 | 7/2002 | Toms et al. | |
| 6,433,282 B1 | 8/2002 | Traversa | |
| 6,448,497 B1 | 9/2002 | Mccracken et al. | |
| 6,462,509 B1 | 10/2002 | Abe et al. | |
| 6,489,745 B1 | 12/2002 | Koreis | |
| 6,527,570 B1 | 3/2003 | Hartman et al. | |
| 6,547,050 B1 | 4/2003 | Schroder et al. | |
| 6,568,942 B2 | 5/2003 | Lau et al. | |
| 6,607,391 B2 | 8/2003 | Mendelson et al. | |
| 6,650,088 B1 | 11/2003 | Webb et al. | |
| 6,683,438 B2 | 1/2004 | Park et al. | |
| 6,719,576 B2 | 4/2004 | Hartman et al. | |
| 6,755,676 B2 * | 6/2004 | Milan ................... H01R 25/003 439/214 | |
| 6,756,765 B2 | 6/2004 | Bruning | |
| 6,803,744 B1 | 10/2004 | Sabo | |
| 6,820,562 B2 | 11/2004 | Zodnik et al. | |
| 6,844,702 B2 | 1/2005 | Giannopoulos et al. | |
| 6,913,477 B2 | 7/2005 | Dayan et al. | |
| D516,028 S | 2/2006 | Deng | |
| 7,019,214 B2 | 3/2006 | Kubel et al. | |
| 7,063,562 B2 | 6/2006 | Henley et al. | |
| 7,121,196 B2 | 10/2006 | Mellis | |
| 7,163,409 B1 | 1/2007 | Chen et al. | |
| 7,172,196 B2 | 2/2007 | Randall | |
| 7,180,265 B2 | 2/2007 | Naskali et al. | |
| 7,183,504 B2 | 2/2007 | Byrne | |
| 7,186,118 B2 | 3/2007 | Hansen et al. | |
| 7,201,589 B2 * | 4/2007 | Jong ..................... H01R 25/14 439/94 | |
| 7,211,986 B1 | 5/2007 | Flowerdew et al. | |
| 7,217,142 B1 | 5/2007 | Wu | |
| 7,223,123 B2 | 5/2007 | Brooks | |
| 7,247,046 B1 | 7/2007 | Wu | |
| 7,248,017 B2 | 7/2007 | Cheng et al. | |
| 7,262,700 B2 | 8/2007 | Hsu | |
| 7,311,526 B2 | 12/2007 | Rohrbach et al. | |
| D563,323 S | 3/2008 | Henry | |
| 7,341,458 B1 | 3/2008 | Koh | |
| 7,378,817 B2 | 5/2008 | Calhoon et al. | |
| 7,393,250 B2 | 7/2008 | Tanaka | |
| 7,399,205 B2 | 7/2008 | McNeely et al. | |
| 7,414,380 B2 | 8/2008 | Tang et al. | |
| 7,416,414 B2 | 8/2008 | Bozzone et al. | |
| 7,445,452 B2 | 11/2008 | Wu | |
| 7,471,062 B2 | 12/2008 | Bruning | |
| 7,495,414 B2 | 2/2009 | Hui | |
| 7,504,802 B2 | 3/2009 | Bersenev | |
| 7,514,899 B2 | 4/2009 | Deng-Peng | |
| 7,518,337 B2 | 4/2009 | Beart et al. | |
| 7,544,100 B2 | 6/2009 | Teitelbaum | |
| 7,547,235 B2 | 6/2009 | Hasid | |
| 7,566,224 B2 | 7/2009 | Wu | |
| 7,614,896 B2 | 11/2009 | Johnson et al. | |
| 7,625,212 B2 | 12/2009 | Du | |
| 7,632,134 B2 | 12/2009 | Su et al. | |
| 7,638,970 B1 | 12/2009 | Gebhard et al. | |
| 7,658,613 B1 | 2/2010 | Griffin et al. | |
| D611,898 S | 3/2010 | Yang | |
| D611,900 S | 3/2010 | Yang | |
| 7,671,561 B2 | 3/2010 | Ludtke | |
| 7,701,171 B2 | 4/2010 | Defant et al. | |
| 7,736,151 B1 | 6/2010 | Yang | |
| 7,777,448 B2 | 8/2010 | Beghelli | |
| 7,806,569 B2 | 10/2010 | Sanroma et al. | |
| 7,808,122 B2 | 10/2010 | Menas et al. | |
| 7,819,676 B1 | 10/2010 | Cardoso et al. | |
| 7,826,873 B2 | 11/2010 | Telefus | |
| D629,752 S | 12/2010 | Akana et al. | |
| 7,855,529 B2 | 12/2010 | Liu | |
| 7,863,861 B2 | 1/2011 | Cheng et al. | |
| 7,868,585 B2 | 1/2011 | Sarnowsky et al. | |
| 7,872,445 B2 | 1/2011 | Hui | |
| 7,874,844 B1 | 1/2011 | Fitts, Jr. | |
| 7,874,856 B1 * | 1/2011 | Schriefer ............ H01R 25/003 439/214 | |
| 7,878,845 B2 | 2/2011 | Byrne | |
| 7,906,936 B2 | 3/2011 | Azancot et al. | |
| 7,916,467 B2 | 3/2011 | Hotelling et al. | |
| 7,928,602 B2 | 4/2011 | Heidmann | |
| 7,932,638 B2 | 4/2011 | Randall | |
| 7,940,024 B2 | 5/2011 | Zhang et al. | |
| 7,963,774 B2 | 6/2011 | Shiff et al. | |
| 7,967,609 B2 | 6/2011 | Capece et al. | |
| 7,982,436 B2 | 7/2011 | Randall | |
| 7,986,059 B2 | 7/2011 | Randall | |
| 7,997,910 B2 | 8/2011 | Myers et al. | |
| 8,022,664 B2 | 9/2011 | Shu | |
| 8,040,103 B2 | 10/2011 | Hui et al. | |
| 8,049,370 B2 | 11/2011 | Azancot et al. | |
| 8,061,886 B1 | 11/2011 | Kraus et al. | |
| 8,072,183 B2 | 12/2011 | Griffin | |
| 8,075,054 B2 | 12/2011 | Smith | |
| 8,081,408 B2 | 12/2011 | Randall | |

(56) References Cited

U.S. PATENT DOCUMENTS

| | | |
|---|---|---|
| 8,102,147 B2 | 1/2012 | Jung |
| 8,115,448 B2 | 2/2012 | John |
| 8,120,311 B2 | 2/2012 | Baarman et al. |
| 8,127,155 B2 | 2/2012 | Baarman et al. |
| 8,146,316 B2 | 4/2012 | Boss et al. |
| 8,164,222 B2 | 4/2012 | Baarman |
| 8,168,888 B2 | 5/2012 | Potter |
| 8,183,825 B2 | 5/2012 | Sa |
| 8,183,827 B2 | 5/2012 | Lyon |
| 8,193,764 B2 | 6/2012 | Jakubowski |
| 8,198,861 B2 | 6/2012 | Kudou |
| 8,204,531 B2 | 6/2012 | Jin et al. |
| 8,207,627 B2 | 6/2012 | Aldag et al. |
| 8,217,528 B2 | 7/2012 | Fleisig |
| 8,232,764 B2 | 7/2012 | Inoue et al. |
| 8,234,509 B2 | 7/2012 | Gioscia et al. |
| 8,235,826 B2 | 8/2012 | Randall |
| 8,245,843 B1 | 8/2012 | Wu |
| 8,248,024 B2 | 8/2012 | Yuan et al. |
| 8,248,028 B2 | 8/2012 | Toya et al. |
| 8,262,244 B2 | 9/2012 | Metcalf et al. |
| 8,271,038 B2 | 9/2012 | Fadell et al. |
| 8,276,271 B2 | 10/2012 | Morris et al. |
| 8,310,200 B2 | 11/2012 | Matouka et al. |
| 8,342,857 B2 | 1/2013 | Palli et al. |
| 8,348,492 B2 | 1/2013 | Mier-langner et al. |
| 8,352,114 B2 | 1/2013 | More et al. |
| 8,354,821 B2 | 1/2013 | Cheng et al. |
| 8,359,073 B2 | 1/2013 | Kamiyama et al. |
| 8,362,743 B2 | 1/2013 | Andrieu et al. |
| 8,388,353 B2 | 3/2013 | Kiani et al. |
| 8,390,404 B2 | 3/2013 | Zou |
| 8,395,353 B2 | 3/2013 | Wang et al. |
| 8,400,104 B2 | 3/2013 | Adamczyk et al. |
| 8,401,219 B2 | 3/2013 | Hankey et al. |
| 8,421,407 B2 | 4/2013 | Johnson |
| 8,432,125 B2 | 4/2013 | Takada et al. |
| D682,213 S | 5/2013 | Byrne et al. |
| 8,441,230 B2 | 5/2013 | Boyles et al. |
| 8,447,366 B2 | 5/2013 | Ungari et al. |
| 8,449,050 B2 | 5/2013 | Karg |
| 8,461,800 B2 | 6/2013 | Kozakai |
| 8,466,654 B2 | 6/2013 | Cook et al. |
| D685,329 S | 7/2013 | Byrne et al. |
| 8,482,160 B2 | 7/2013 | Johnson et al. |
| 8,491,312 B2 | 7/2013 | Rudisill et al. |
| 8,497,753 B2 | 7/2013 | Difonzo et al. |
| 8,541,976 B2 | 9/2013 | Arai et al. |
| 8,553,408 B2 | 10/2013 | Supran et al. |
| 8,558,410 B2 | 10/2013 | Itkonen |
| 8,614,526 B2 | 12/2013 | Cook et al. |
| 8,616,921 B2 | 12/2013 | Byrne et al. |
| 8,622,756 B2 * | 1/2014 | Smed ............... H01R 9/2408 439/120 |
| 8,624,547 B2 | 1/2014 | Thorsell et al. |
| 8,626,249 B2 | 1/2014 | Ungari et al. |
| 8,629,577 B2 | 1/2014 | Azancot et al. |
| 8,629,652 B2 | 1/2014 | Partovi et al. |
| 8,629,654 B2 | 1/2014 | Partovi et al. |
| 8,665,593 B2 | 3/2014 | Lev et al. |
| 8,669,676 B2 | 3/2014 | Karalis et al. |
| 8,680,811 B2 | 3/2014 | Mochida et al. |
| 8,704,407 B2 | 4/2014 | Kozakai |
| 8,716,903 B2 | 5/2014 | Kurs et al. |
| 8,729,735 B2 | 5/2014 | Urano |
| 8,760,253 B2 | 6/2014 | Hickox |
| 8,772,973 B2 | 7/2014 | Kurs |
| 8,790,120 B2 | 7/2014 | Wang et al. |
| 8,810,196 B2 | 8/2014 | Ettes et al. |
| 8,836,175 B1 | 9/2014 | Eichelberg |
| 8,837,157 B2 | 9/2014 | Kuhar |
| 8,847,436 B2 | 9/2014 | Maxik et al. |
| 8,868,939 B2 | 10/2014 | Matsuoka et al. |
| 8,888,540 B2 | 11/2014 | Hoffmeister |
| 8,890,369 B2 | 11/2014 | Baarman et al. |
| 8,890,471 B2 | 11/2014 | Chen |
| 8,901,778 B2 | 12/2014 | Kesler et al. |
| 8,921,697 B2 | 12/2014 | Potter |
| 8,933,661 B2 | 1/2015 | Nergaard et al. |
| 8,937,407 B2 | 1/2015 | Byrne et al. |
| 8,937,409 B2 | 1/2015 | Ichikawa et al. |
| 8,951,054 B2 | 2/2015 | Byrne et al. |
| 8,963,486 B2 | 2/2015 | Kirby et al. |
| 8,963,490 B2 | 2/2015 | Tabata et al. |
| 8,965,720 B2 | 2/2015 | Azancot et al. |
| 8,968,011 B2 | 3/2015 | Hoffmeister |
| 8,970,070 B2 | 3/2015 | Sada et al. |
| 8,971,072 B2 | 3/2015 | Calvin et al. |
| 8,973,816 B1 | 3/2015 | Saini |
| 8,985,813 B2 | 3/2015 | Zaderej et al. |
| 8,986,021 B2 | 3/2015 | Keswani |
| 8,994,231 B1 | 3/2015 | Corhodzic et al. |
| 9,004,930 B2 | 4/2015 | Gualino et al. |
| 9,013,069 B2 | 4/2015 | Yamamoto et al. |
| 9,021,277 B2 | 4/2015 | Shearer et al. |
| 9,041,253 B2 | 5/2015 | Yun et al. |
| 9,077,193 B2 | 7/2015 | Uramoto et al. |
| 9,087,655 B2 | 7/2015 | Enomoto et al. |
| 9,093,853 B2 | 7/2015 | Schatz et al. |
| D739,354 S | 9/2015 | Nook et al. |
| 9,124,308 B2 | 9/2015 | Metcalf |
| 9,146,029 B2 | 9/2015 | Nicieja et al. |
| 9,147,965 B2 | 9/2015 | Lee |
| 9,155,170 B2 | 10/2015 | Shah et al. |
| 9,296,304 B2 | 3/2016 | Krause |
| 9,306,635 B2 | 4/2016 | Kurs et al. |
| 9,312,614 B2 | 4/2016 | Harvey |
| 9,356,400 B2 | 5/2016 | Little et al. |
| 9,373,943 B1 | 6/2016 | Tannenbaum |
| 9,564,726 B2 | 2/2017 | Mccauley et al. |
| 9,583,871 B1 | 2/2017 | Rudisill et al. |
| 9,614,338 B2 | 4/2017 | Alexander et al. |
| 9,635,931 B2 | 5/2017 | Mandon et al. |
| 9,660,376 B2 | 5/2017 | Gao et al. |
| 9,685,730 B2 | 6/2017 | Jones et al. |
| 2002/0008044 A1 | 1/2002 | Burrus et al. |
| 2002/0171335 A1 | 11/2002 | Held |
| 2003/0092299 A1 | 5/2003 | Hartman et al. |
| 2004/0026998 A1 | 2/2004 | Henriott et al. |
| 2004/0131928 A1 | 7/2004 | Dayan et al. |
| 2004/0165330 A1 | 8/2004 | Wolinsky et al. |
| 2004/0189246 A1 | 9/2004 | Bulai et al. |
| 2004/0251873 A1 | 12/2004 | Simoes et al. |
| 2005/0024011 A1 | 2/2005 | Chen |
| 2005/0052156 A1 | 3/2005 | Liebenow |
| 2005/0075696 A1 | 4/2005 | Forsberg et al. |
| 2005/0102935 A1 | 5/2005 | Picard |
| 2005/0162125 A1 | 7/2005 | Yu et al. |
| 2005/0208817 A1 | 9/2005 | Dayan et al. |
| 2005/0230609 A1 | 10/2005 | Randall |
| 2006/0205381 A1 | 9/2006 | Beart et al. |
| 2007/0069684 A1 | 3/2007 | Ramsden |
| 2007/0161262 A1 | 7/2007 | Lloyd |
| 2007/0191075 A1 | 8/2007 | Greene et al. |
| 2007/0228680 A1 | 10/2007 | Reppert et al. |
| 2008/0067874 A1 | 3/2008 | Tseng |
| 2008/0116847 A1 | 5/2008 | Loke et al. |
| 2008/0165982 A1 | 7/2008 | Hankey et al. |
| 2008/0166965 A1 | 7/2008 | Greene et al. |
| 2008/0211458 A1 | 9/2008 | Lawther et al. |
| 2008/0238364 A1 | 10/2008 | Weber et al. |
| 2008/0246215 A1 | 10/2008 | Randall |
| 2008/0303479 A1 | 12/2008 | Park et al. |
| 2009/0033280 A1 | 2/2009 | Choi et al. |
| 2009/0056970 A1 * | 3/2009 | Hoffman ............... H02G 3/00 174/66 |
| 2009/0072782 A1 | 3/2009 | Randall |
| 2009/0072784 A1 | 3/2009 | Erickson |
| 2009/0102416 A1 | 4/2009 | Burley |
| 2009/0133942 A1 | 5/2009 | Iisaka et al. |
| 2009/0134712 A1 | 5/2009 | Cook et al. |
| 2009/0153098 A1 | 6/2009 | Toya et al. |
| 2009/0212737 A1 | 8/2009 | Johnson et al. |
| 2009/0219712 A1 | 9/2009 | Verjans et al. |

(56) References Cited

U.S. PATENT DOCUMENTS

| | | |
|---|---|---|
| 2009/0236140 A1 | 9/2009 | Randall |
| 2009/0236909 A1* | 9/2009 | Aldag .................. H01R 25/142 307/39 |
| 2009/0243396 A1 | 10/2009 | Randall |
| 2009/0278494 A1 | 11/2009 | Randall |
| 2010/0007307 A1 | 1/2010 | Baarman et al. |
| 2010/0022285 A1 | 1/2010 | Randall et al. |
| 2010/0033127 A1 | 2/2010 | Griffin et al. |
| 2010/0038970 A1 | 2/2010 | Cook et al. |
| 2010/0055928 A1 | 3/2010 | Randall |
| 2010/0066305 A1 | 3/2010 | Takahashi et al. |
| 2010/0102789 A1 | 4/2010 | Randall |
| 2010/0109604 A1 | 5/2010 | Boys et al. |
| 2010/0156197 A1 | 6/2010 | Randall |
| 2010/0156345 A1 | 6/2010 | Phelps |
| 2010/0181440 A1 | 7/2010 | Larsen et al. |
| 2010/0181961 A1 | 7/2010 | Novak et al. |
| 2010/0190435 A1 | 7/2010 | Cook et al. |
| 2010/0201201 A1 | 8/2010 | Mobarhan et al. |
| 2010/0201202 A1 | 8/2010 | Kirby et al. |
| 2010/0279517 A1 | 11/2010 | Tsai |
| 2010/0314946 A1 | 12/2010 | Budde et al. |
| 2011/0018498 A1 | 1/2011 | Soar |
| 2011/0043327 A1 | 2/2011 | Baarman et al. |
| 2011/0057606 A1 | 3/2011 | Saunamaki |
| 2011/0062793 A1 | 3/2011 | Azancot et al. |
| 2011/0090723 A1 | 4/2011 | Hu et al. |
| 2011/0134601 A1 | 6/2011 | Sa |
| 2011/0197794 A1 | 8/2011 | Nunes |
| 2011/0210617 A1 | 9/2011 | Randall |
| 2011/0215755 A1 | 9/2011 | Hwang et al. |
| 2011/0227527 A1 | 9/2011 | Zhu et al. |
| 2011/0241607 A1 | 10/2011 | Wiegers |
| 2012/0025625 A1 | 2/2012 | Jufer |
| 2012/0028505 A1 | 2/2012 | Weber et al. |
| 2012/0032525 A1 | 2/2012 | Oyobe et al. |
| 2012/0091797 A1 | 4/2012 | Kesler et al. |
| 2012/0177324 A1 | 7/2012 | Schwandt et al. |
| 2012/0280647 A1 | 11/2012 | Perez |
| 2013/0033228 A1 | 2/2013 | Raedy |
| 2013/0057203 A1 | 3/2013 | Jones et al. |
| 2013/0063873 A1 | 3/2013 | Wodrich et al. |
| 2013/0065406 A1 | 3/2013 | Rohrbach et al. |
| 2013/0113423 A1 | 5/2013 | Baarman et al. |
| 2013/0119929 A1 | 5/2013 | Partovi |
| 2013/0132743 A1 | 5/2013 | Azancot et al. |
| 2013/0170794 A1 | 7/2013 | Difonzo et al. |
| 2013/0200989 A1 | 8/2013 | Byrne et al. |
| 2013/0214743 A1 | 8/2013 | Vorenkamp et al. |
| 2013/0234481 A1 | 9/2013 | Johnson |
| 2013/0241474 A1 | 9/2013 | Moshfeghi |
| 2014/0000771 A1 | 1/2014 | Sherman et al. |
| 2014/0021798 A1 | 1/2014 | Kesler et al. |
| 2014/0035385 A1 | 2/2014 | Hatanaka |
| 2014/0049118 A1 | 2/2014 | Karalis et al. |
| 2014/0084703 A1 | 3/2014 | Hall et al. |
| 2014/0091634 A1 | 4/2014 | Mayo et al. |
| 2014/0091638 A1 | 4/2014 | Azancot et al. |
| 2014/0091640 A1 | 4/2014 | Scholz et al. |
| 2014/0103867 A1 | 4/2014 | Baarman |
| 2014/0103868 A1 | 4/2014 | Gilbert |
| 2014/0103873 A1 | 4/2014 | Partovi et al. |
| 2014/0159652 A1 | 6/2014 | Hall et al. |
| 2014/0167501 A1 | 6/2014 | Marosi et al. |
| 2014/0167688 A1 | 6/2014 | Doyle et al. |
| 2014/0175868 A1 | 6/2014 | Sakakibara et al. |
| 2014/0175895 A1 | 6/2014 | Ishi et al. |
| 2014/0175898 A1 | 6/2014 | Kurs et al. |
| 2014/0197695 A1 | 7/2014 | Waffenschmidt et al. |
| 2014/0197755 A1 | 7/2014 | Willemsen et al. |
| 2014/0203661 A1 | 7/2014 | Dayan et al. |
| 2014/0206384 A1 | 7/2014 | Kim et al. |
| 2014/0232185 A1 | 8/2014 | Sempel et al. |
| 2014/0252869 A1 | 9/2014 | Kamiura et al. |
| 2014/0252873 A1 | 9/2014 | Irish et al. |
| 2014/0253032 A1 | 9/2014 | Bruwer et al. |
| 2014/0265617 A1 | 9/2014 | Roy et al. |
| 2014/0266014 A1 | 9/2014 | Pai et al. |
| 2014/0266018 A1 | 9/2014 | Carobolante |
| 2014/0284159 A1 | 9/2014 | Boys |
| 2014/0285008 A1 | 9/2014 | Azancot et al. |
| 2014/0285030 A1 | 9/2014 | Nakamura et al. |
| 2014/0285140 A1 | 9/2014 | Jung |
| 2014/0292097 A1 | 10/2014 | Mach et al. |
| 2014/0292269 A1 | 10/2014 | Keating et al. |
| 2014/0300205 A1 | 10/2014 | Schimanski |
| 2014/0306654 A1 | 10/2014 | Partovi |
| 2014/0312707 A1 | 10/2014 | Fiorello et al. |
| 2014/0327320 A1 | 11/2014 | Muhs et al. |
| 2014/0335919 A1 | 11/2014 | Stewart et al. |
| 2014/0339911 A1 | 11/2014 | Abe |
| 2014/0339913 A1 | 11/2014 | Tsuji et al. |
| 2014/0354220 A1 | 12/2014 | Liu |
| 2014/0361633 A1 | 12/2014 | Abe |
| 2014/0368048 A1 | 12/2014 | Leabman et al. |
| 2014/0368163 A1 | 12/2014 | Ho |
| 2014/0368476 A1 | 12/2014 | Rauch et al. |
| 2015/0001957 A1 | 1/2015 | Ichikawa |
| 2015/0022022 A1 | 1/2015 | Zeine |
| 2015/0054351 A1 | 2/2015 | Deguchi et al. |
| 2015/0054355 A1 | 2/2015 | Ben-Shalom et al. |
| 2015/0061405 A1 | 3/2015 | Harakawa et al. |
| 2015/0061585 A1 | 3/2015 | Obayashi et al. |
| 2015/0069965 A1 | 3/2015 | Verschueren |
| 2015/0076918 A1 | 3/2015 | Mazaki et al. |
| 2015/0084577 A1 | 3/2015 | Schuessler |
| 2015/0091386 A1 | 4/2015 | Nagamine et al. |
| 2015/0091389 A1 | 4/2015 | Byrne et al. |
| 2015/0091518 A1 | 4/2015 | Komma et al. |
| 2015/0091522 A1 | 4/2015 | Byrne et al. |
| 2015/0097444 A1 | 4/2015 | Kamiura et al. |
| 2015/0123496 A1 | 5/2015 | Leabman et al. |
| 2015/0130285 A1 | 5/2015 | Leabman et al. |
| 2015/0130286 A1 | 5/2015 | Kozasu et al. |
| 2015/0130287 A1 | 5/2015 | Steudtner et al. |
| 2015/0130293 A1 | 5/2015 | Hajimiri et al. |
| 2015/0130412 A1 | 5/2015 | Partovi |
| 2015/0145343 A1 | 5/2015 | Chiyo et al. |
| 2015/0145475 A1 | 5/2015 | Partovi et al. |
| 2015/0162754 A1 | 6/2015 | Nakano et al. |
| 2015/0188320 A1 | 7/2015 | Madawala et al. |
| 2015/0263570 A1 | 9/2015 | Van Goor et al. |
| 2016/0013837 A1 | 1/2016 | Howell et al. |
| 2016/0172807 A1* | 6/2016 | Clark-Ward .......... F21V 21/096 439/39 |
| 2016/0190735 A1 | 6/2016 | Zantout et al. |
| 2016/0268728 A1 | 9/2016 | Zantout et al. |
| 2016/0268825 A1 | 9/2016 | Byrne et al. |
| 2016/0294227 A1 | 10/2016 | Podkamien et al. |
| 2016/0329746 A1 | 11/2016 | Hewelt |
| 2017/0077739 A1 | 3/2017 | Jouper et al. |
| 2017/0093087 A1 | 3/2017 | Esmaeili et al. |
| 2017/0207612 A1 | 7/2017 | Handler |
| 2019/0056631 A1* | 2/2019 | Brown .................. H01R 41/00 |

FOREIGN PATENT DOCUMENTS

| | | |
|---|---|---|
| CN | 87204245 | 6/1988 |
| CN | 2283930 | 6/1998 |
| CN | 201877594 | 6/2011 |
| CN | 205159639 | 4/2016 |
| CN | 106229776 | 12/2016 |
| DE | 102006002433 | 1/2009 |
| DE | 102015005240 | 10/2016 |
| EP | 0040284 | 12/1986 |
| EP | 1335477 | 8/2003 |
| EP | 2611041 | 7/2013 |
| FR | 2723662 | 10/1996 |
| FR | 2971898 | 8/2012 |
| GB | 2138995 | 10/1984 |
| GB | 2441949 | 9/2009 |
| GB | 2461598 | 1/2010 |
| JP | H 09322436 | 12/1997 |
| JP | 2001292535 | 10/2001 |

(56) References Cited

FOREIGN PATENT DOCUMENTS

| | | |
|---|---|---|
| JP | 2001309579 | 11/2001 |
| JP | 2002042986 | 2/2002 |
| JP | 2005094843 | 4/2005 |
| JP | 2008036101 | 2/2008 |
| JP | 2009159676 | 7/2009 |
| JP | 2009159683 | 7/2009 |
| JP | 2010279198 | 12/2010 |
| JP | 2011050511 | 3/2011 |
| JP | 2011083407 | 4/2011 |
| JP | 2011151900 | 8/2011 |
| KR | 20090001609 | 8/2007 |
| KR | 100976163 | 8/2010 |
| WO | WO 9220958 | 11/1992 |
| WO | WO 9746773 | 12/1997 |
| WO | WO 9851963 | 11/1998 |
| WO | WO2008/099306 | 8/2008 |
| WO | WO 2012083522 | 6/2012 |
| WO | WO 2012092561 | 7/2012 |
| WO | WO 2012093398 | 7/2012 |
| WO | WO 2012132142 | 10/2012 |
| WO | WO 2012168469 | 12/2012 |
| WO | WO 2013051607 | 4/2013 |
| WO | WO 2013129796 | 9/2013 |
| WO | WO 2014003380 | 1/2014 |
| WO | WO 2014079539 | 5/2014 |
| WO | WO 2015059163 | 4/2015 |
| WO | WO2016/007884 | 1/2016 |
| WO | WO 2016132362 | 8/2016 |
| WO | WO 2016142728 | 9/2016 |
| WO | WO 2016188798 | 12/2016 |
| WO | WO 2017033010 | 3/2017 |

OTHER PUBLICATIONS

Interneational Search Report and Written Opinion from corresponding PCT application PCT/US2018/020378, dated Jun. 6, 2018 (16 pages).

\* cited by examiner

FIG. 1
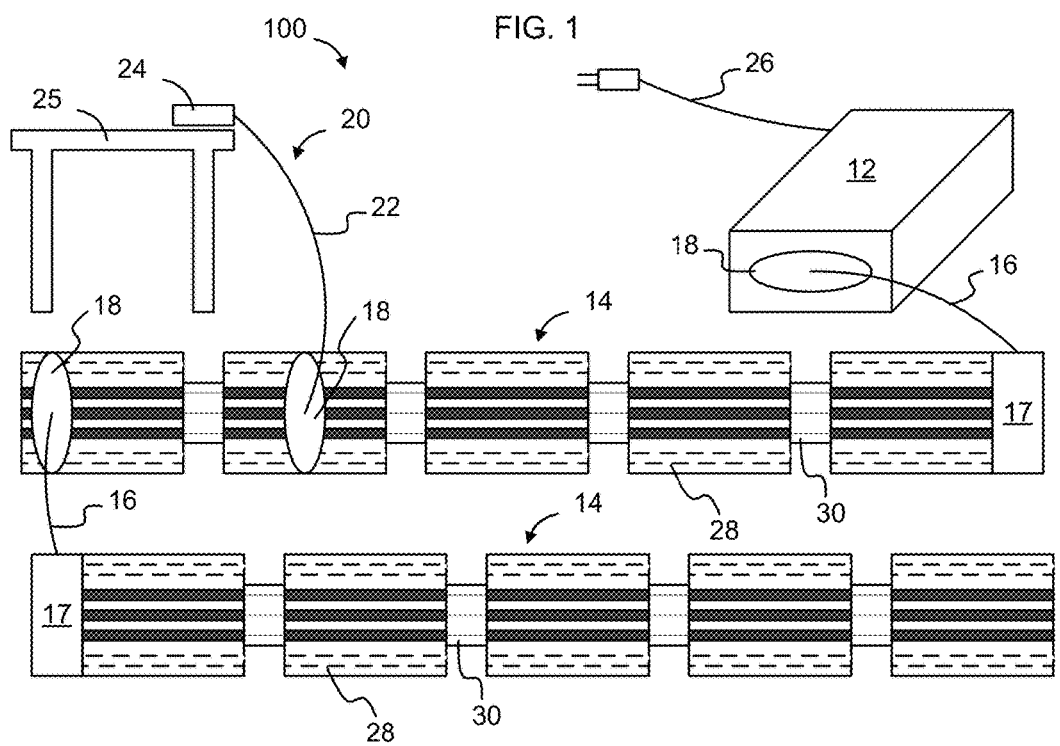
FIG. 2A
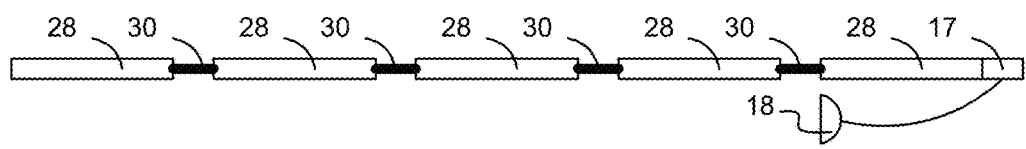
FIG. 2B
FIG. 2C
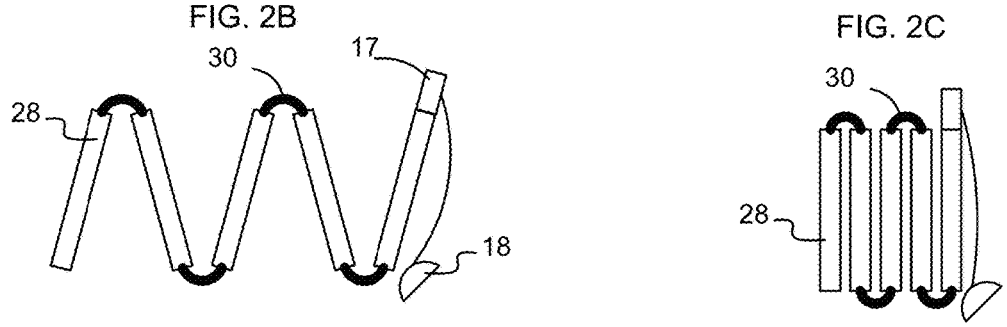

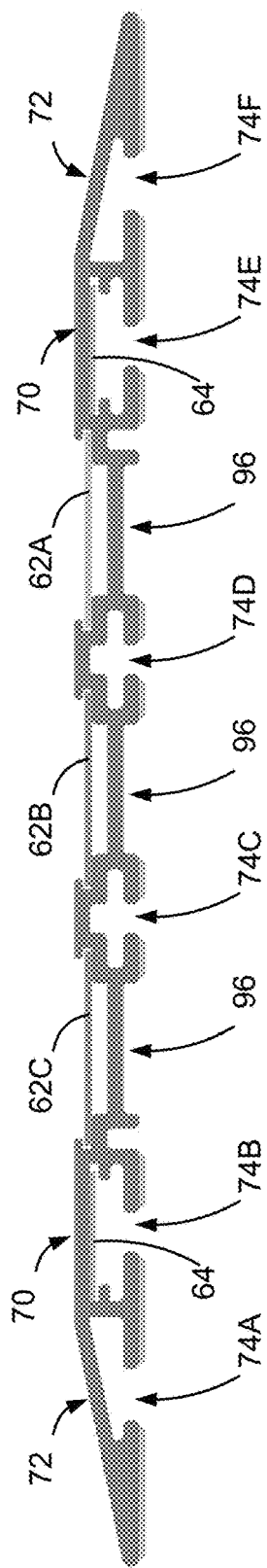
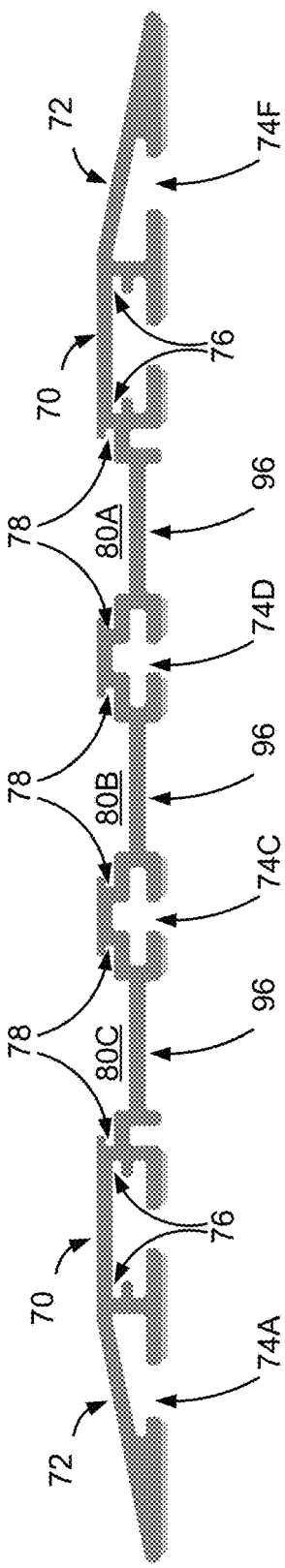

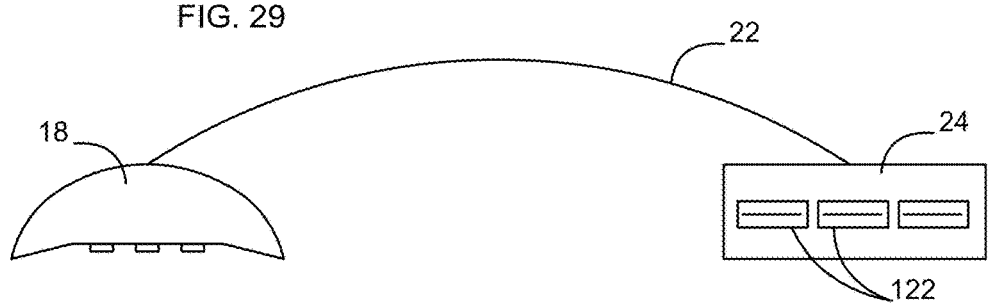
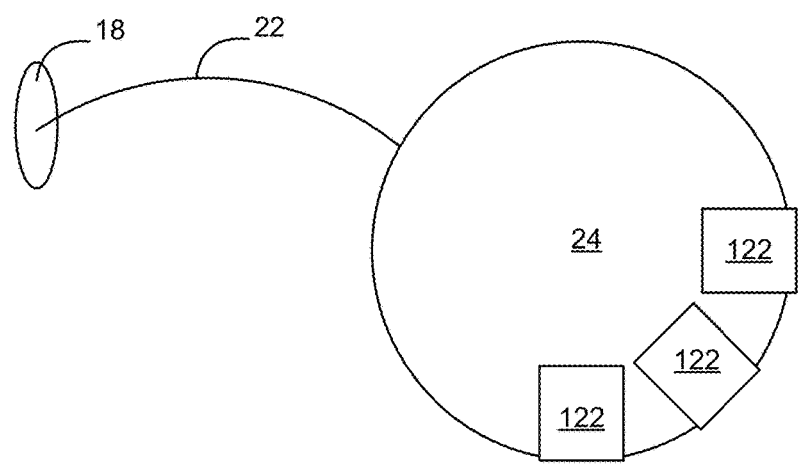
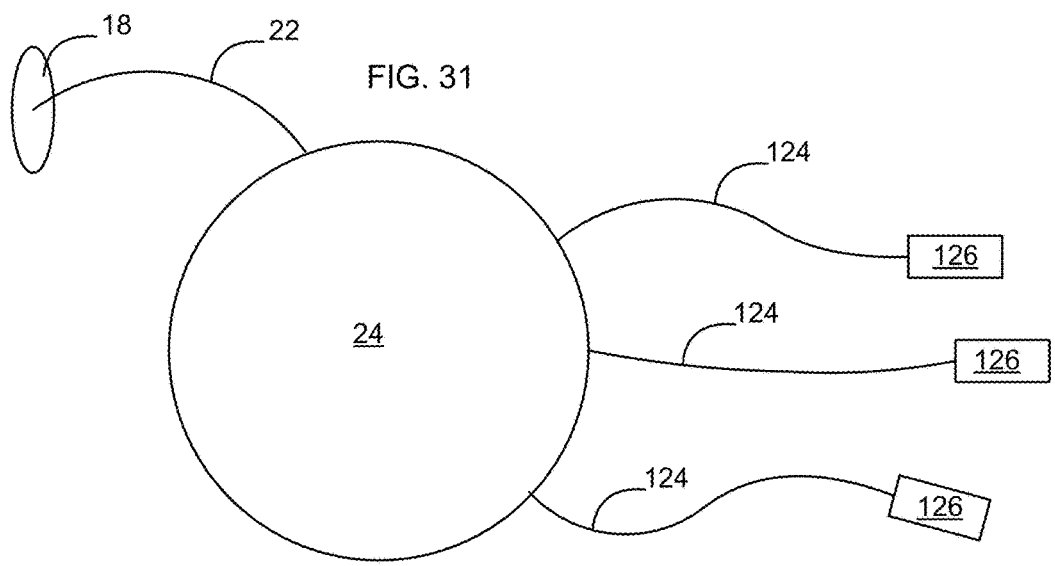

RAPIDLY DEPLOYABLE FLOOR POWER SYSTEM

CROSS-REFERENCE TO RELATED APPLICATIONS

This application claims priority to U.S. Provisional Patent Application No. 62/523,560, filed Jun. 22, 2017, entitled Portable Floor Power System, the content of which is hereby incorporated herein by reference.

BACKGROUND

This disclosure relates to a power distribution systems and, more particularly, to a rapidly deployable floor power system.

SUMMARY

All examples and features mentioned below can be combined in any technically possible way.

In one aspect, a rapidly deployable floor power system includes a base unit for supplying low voltage DC power to one or more foldable power tracks. Each foldable power track has a set of rigid track sections with exposed track power contacts on a top surface. The rigid track sections are electrically and mechanically interconnected by flexible track connectors that enable the power track to be folded when the power track is to be moved or stored, and unfolded for rapid deployment in an area to be supplied with power. The rigid track sections lie approximately flush with the floor to minimize tripping potential. Magnetic connectors engage the track to obtain power from the track, and are used to electrically interconnect adjacent tracks. A power distribution unit supplies power via low voltage ports such as USB ports and/or via one or more power whips equipped with barrel jack tips.

In one aspect, a rapidly deployable floor power system includes a base unit for receiving mains power and outputting a DC voltage on a DC power output. The system also includes a foldable power track in electrical communication with the base unit to receive the DC voltage, the foldable power track having a plurality of rigid track sections interconnected by flexible track connectors. The system also includes a power distribution system having a first magnetic electrical connector on a first end of a power distribution cable to magnetically connect to the foldable power track to receive the DC voltage, the power distribution system further having a power distribution unit on a second end of the power distribution cable, the power distribution unit receiving the DC voltage via the power distribution cable and converting the DC voltage to a second DC voltage.

In some implementations, the base unit has a protection circuit to prevent an overcurrent and/or overvoltage condition on the DC power output.

In certain implementations each rigid track section of the foldable power track has a first profile including a flat top surface and beveled edges, the DC power output has a DC power output profile that matches the first profile, and the magnetic electrical connector has a second profile to mate with the first profile.

In some implementations, each rigid track section of the foldable power track has a first profile including a lower surface, a flat top surface, and beveled edges that taper from the flat top surface to the lower surface.

In certain implementations, channels are provided, within the flat top surface of the track sections, to receive exposed track power contacts at the flat top surface.

In some implementations magnetic attractors are provided, below the flat top surface of the track sections, to engage magnets within the magnetic connector.

In certain implementations the base unit has a power conditioning circuit to prevent the DC voltage from being output on the DC power output if the magnetic connector is not in electrical communication with the foldable power track.

In some implementations the base unit supplies DC power at approximately 36V DC.

In certain implementations each of the rigid track sections has a plurality of exposed track power contacts on a top surface.

In some implementations each of the plurality of exposed track power contacts extends substantially a length of the top surface.

In certain implementations the exposed track power contacts of a first of the rigid track sections are electrically connected through the flexible track connectors to exposed track power contacts of a second of the rigid track sections.

In some implementations the first rigid track section is connected by the flexible track connector to the second rigid track section.

In certain implementations the flexible track connector contains wires disposed within the flexible track connector to electrically connect the exposed track power contacts of the first and second rigid track sections.

In some implementations each of the rigid track sections has three exposed track power contacts.

In certain implementations a first of the three exposed track power contacts is electrically connected to a positive output terminal of the DC power output, and a second of the three exposed track power contacts is electrically connected to a ground output terminal of the DC power output.

In some implementations a third of the three exposed track power contacts is electrically connected to a ground output terminal of the DC power output.

In certain implementations the base unit has a first communication unit, the power distribution unit has a second communication unit, and wherein at least one of the three exposed track power contacts is used to pass communication signals between the first communication unit and the second communication unit.

In some implementations the system further includes a track power cable, the track power cable being electrically connected on a first track power cable end to the foldable power track and being electrically connected on a second track power cable end to a second magnetic connector, the second magnetic connector having the same shape as the first magnetic connector.

In certain implementations the track power cable is fixed on the first track power cable end to the foldable power track.

In some implementations the track power cable is connected to a third magnetic connector on the first track power cable end.

In certain implementations the system further includes at least a second foldable power track, having a second track power in electrical communication with the first foldable power track.

In some implementations the magnetic electrical connector has three connectors that are not in a straight line.

In certain implementations the magnetic electrical connector has at least three connectors formed in a straight line.

In some implementations the magnetic electrical connector has six connectors, a first set of three of the six connectors being in a first straight line and a second set of three of the six connectors being in a second straight line, the first straight line being parallel to the second straight line.

In certain implementations the DC power output has exposed power contacts to mate with power contacts of the magnetic electrical connector.

In some implementations the DC power output has magnetic attractors spaced to engage magnets of the magnetic electrical connector.

In certain implementations the magnetic electrical connector includes a plurality of magnets a body having a lower exterior surface and a top shell defining an internal cavity, a printed circuit board disposed within the internal cavity, a plurality of contacts connected to the printed circuit board to extend through apertures in the lower surface, and a plurality of springs disposed within the cavity between a top interior surface of the cavity and the printed circuit board to bias the printed circuit board to bias the printed circuit board toward the lower surface.

In some implementations, when the magnetic electrical connector engages the foldable power track, the magnets of the magnetic electrical connector engage magnetic attractors of the foldable power track to pull the lower surface of the magnetic electrical connector into mating relationship with a profile of the foldable power track.

In certain implementations, when the magnetic electrical connector engages the foldable power track, the plurality of contacts are pushed up into the body of the magnetic electrical connector against a biasing force of the springs.

According to another aspect, a method of rapidly deploying a floor power system within a room is provided. The method includes the steps of unfolding a foldable power track onto a floor of the room, the foldable power track including a plurality of rigid track sections with exposed DC power contacts on a top surface and a plurality of flexible track connectors electrically and mechanically interconnecting the rigid track sections, electrically connecting a base unit to mains power, the base unit containing an AC to DC converter to convert AC power received from mains power to output the low voltage DC power on a DC power output, and electrically connecting the base unit to the foldable power track using a magnetic connector to interconnect a power cord to the base unit.

In some implementations, the method further includes the steps of unfolding at least a second foldable power track onto the floor, and using a magnetic electrical connector to electrically connect the second foldable power track to the first foldable power track.

BRIEF DESCRIPTION OF THE DRAWINGS

FIG. 1 is a functional block diagram of a rapidly deployable floor power system according to an embodiment.

FIGS. 2A-2C show an example foldable power track deployed flat (FIG. 2A), in a state of starting to be folded (FIG. 2B), and fully folded (FIG. 2C).

FIG. 15 is a cross-sectional view of one of the rigid track sections of the example foldable power track of FIG. 11 showing power contacts and magnetic attractors.

FIG. 16 is a cross-sectional view of the rigid track section of FIG. 15 with the power contacts and magnetic attractors removed.

FIGS. 29-31 are functional block diagrams of example power cables having a magnetic electrical connector at one end and a power distribution unit on the other end according to an implementation.

DETAILED DESCRIPTION

Figure 3:
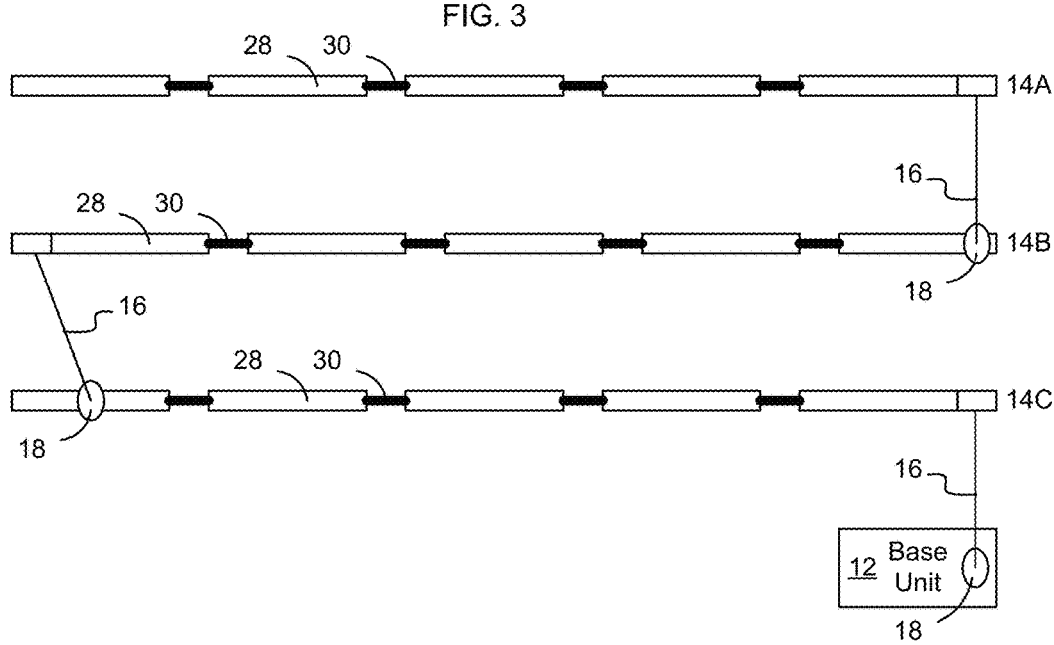
FIGS. 3-5 show example rapidly deployable floor power systems having multiple foldable power tracks electrically interconnected to one or more base units.

Electronic devices require access to power to operate. While many devices have batteries, having an available source of power to recharge the batteries is often desirable. Unfortunately, available power sources are often inconveniently located, particularly in public spaces. For example, people attending a conference may be seated in a conference room away from any wall where power might normally be available. Similarly, students may be seated in a classroom away from any available power source. Since extension cords are tripping hazards, running extension cords into the interior area of a room is often an impractical solution to providing power toward the middle areas of the room. While it may be possible to permanently install electrical outlets within the space, doing so takes time and often takes considerable cost/effort. Likewise installing temporary power often involves taping or otherwise securing loose wires to the floor, which can be unsightly and time consuming. Accordingly, it would be desirable to provide a rapidly deployable floor power system to enable power to be more readily available to be accessible at a larger number of locations. It also would be desirable to provide a rapidly deployable floor power system that is easily configurable to create new power layout topologies as space is reconfigured.

FIG. 1 is a functional block diagram of an example rapidly deployable floor power system 10 according to an implementation. As shown in FIG. 1, in one embodiment a rapidly deployable floor power system 10 includes a base unit 12 and one or more lengths of foldable power track 14. The base unit 12 and foldable power track 14 are connected by a track power cable 16 having a magnetic connector 18 on one end. The track 14 is electrically and mechanically connected to the track power cable 16 at a track input terminal 17. The magnetic connector 18 is designed to electrically and magnetically connect to the base unit 12.

The rapidly deployable floor power system also includes one or more power distribution systems 20, each of which includes a power distribution cable 22 connected to a power distribution unit 24 on one end and to a magnetic connector 18 on the other end. In FIG. 1, the power distribution unit 24 is shown sitting on top of a desk 25. In some embodiments the magnetic connector 18 attached to the end of the track power cable 16 is the same as the magnetic connector 18 attached to the end of the power distribution cable 22.

In some embodiments, mains electricity, e.g. 120V/230V AC power, is supplied to base unit from a standard power outlet via power cord 26. Base unit 12 converts AC power received on power cord 26 into DC power, and outputs the DC power to the foldable power track 14 via track power cable 16. In some implementations the track power cable is on the order of two feet in length, although other lengths may be used depending on the implementation. In some implementations, base unit 12 outputs DC power at 36 volts and 8 amps, for a total available power of 288 Watts on foldable power track 14. In other implementations, other DC/current levels may be used. The DC current levels in some implementations may be one or more DC levels in a range between 20 V and 50 V. In some implementations the DC voltage is approximately 36V. In other implementations the DC voltages is approximately 48V.

In some implementations, base unit 12 includes a shutdown circuit, for example as described in U.S. Pat. No. 7,932,638, to prevent a person from receiving an electrical shock if they contact both positive and neutral contacts of foldable power track 14, and to cease output of electrical power to the track in the event a conductive object comes into contact with both positive and neutral contacts.

In some implementations, foldable power track 14 is formed from rigid track sections 28 interconnected by flexible track connectors 30. The use of rigid track sections 28 and interspersed flexible track connectors 30 enables the foldable power track to lay flat as shown in FIG. 2A, and to be folded into a compact form for storage, as shown in FIGS. 2B, and 2C. By folding the foldable power track 14 into the position shown in FIG. 2C, the foldable power track 14 can be folded for transportation and/or storage. The rigid track sections may be made out of polycarbonate or other suitably dense/solid plastic material to enable the foldable power track 14 to be walked on while disposed on the floor. A bottom surface of the rigid track sections may be coated with a non-slip rubber or other elastomer to minimize lateral movement of the track during normal use.

Although the rapidly deployable floor power system 10 of FIG. 1 shows the base unit 12 connected to a single foldable power track 14, optionally the base unit 12 can be directly connected to more than one foldable power track 14. Likewise, as shown in FIG. 1, multiple foldable power tracks 14 can be electrically connected to each other in series. As noted above, in some implementations the magnetic connector 18 on the end of track power cable 16 is designed to connect to both the base unit 12 and to the foldable power track 14. Accordingly, the magnetic connector 18 of a second foldable power track 14 can electrically connect to another near-by foldable power track 14. Accordingly, a single power unit 12 can supply power to multiple daisy-chained foldable power tracks 14 to enable the single power unit to provide power over an extended area serviced by multiple interconnected foldable power tracks 14.

In some implementations a power distribution system 20 can connect via a magnetic connector 18 directly to the base unit 12, to enable the power distribution unit 24 to obtain power directly from the base unit 12 without the interposition of a foldable power track 14. This further enhances the flexibility of the manner in which the rapidly deployable floor power system can be used to provide power within a room.

Figure 4:
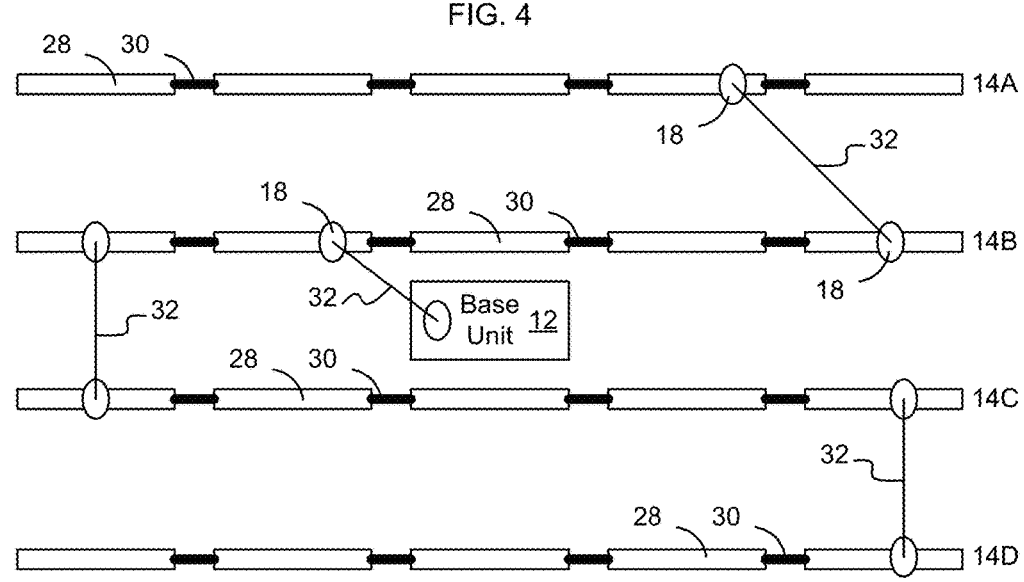
Figure 5:
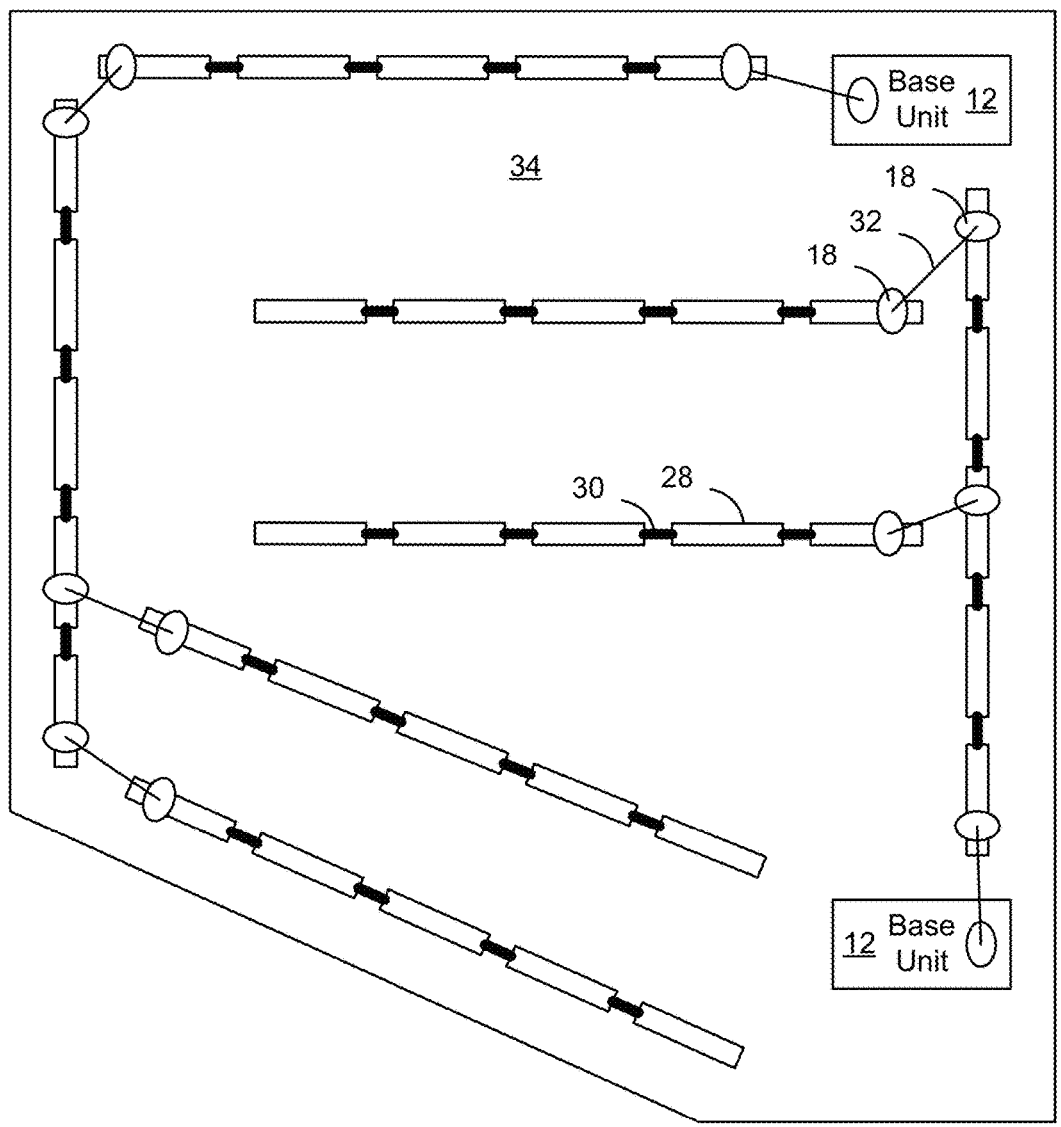

FIGS. 3-5 show example rapidly deployable floor power systems having multiple foldable power tracks 14 electrically interconnected to a single base unit. As shown in FIGS. 3-5, the rapidly deployable floor power system is easily configurable to create new power layout topologies as space is reconfigured.

FIG. 3 shows an implementation similar to FIG. 1, in which each section of foldable power track 14 has a track input terminal 17 connected to the track which forms one end of the track power cable 16. A magnetic connector 18 on the opposite end of the track power cable 16 allows the track power cable 16 to connect to another foldable power track 14 at any location along the length of the other foldable power track 14.

Figure 6:
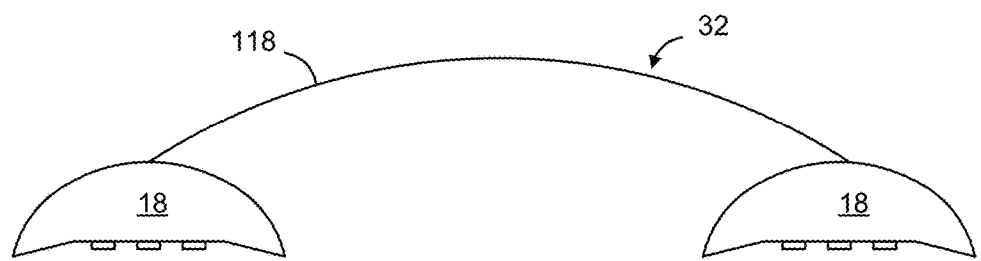
FIG. 6 is a functional block diagram of a power cable having a magnetic electrical connector at each end, each magnetic connector being designed to magnetically engage the base unit and/or one or more rigid track sections according to an implementation.

FIGS. 4 and 5 show another implementation in which a dual ended magnetic power cable 32 is used to interconnect the base unit 12 with foldable power track 14, and to connect between foldable power track sections 14. A functional block diagram of an example dual ended magnetic power cable 32 is shown in FIG. 6. As shown in FIG. 6, the dual ended magnetic power cable 32 in this implementation has a magnetic connector 18 on each end of a cable 118. In some implementations the two magnetic connectors 18 are identical, and each can mate with either the foldable power track 14 or the base unit 12.

FIG. 3 shows a rapidly deployable floor power system having three sections of foldable power track 14 connected together in series. Specifically, in FIG. 3 base unit 12 connects to foldable power track 14C. Foldable power track 14B connects to foldable power track 14C, and foldable power track 14A connects to foldable power track 14B.

FIG. 4 shows a rapidly deployable floor power system having four sections of foldable power track 14 connected together in a branched network. Specifically, in FIG. 3 base unit 12 connects to foldable power track 14B. Foldable power track 14A connects in series to foldable power track 14B. Foldable power track 14C, like foldable power track 14A, also connects to foldable power track 14B. Foldable power track 14D connects in series to foldable power track 14C. In this manner the foldable power tracks 14 are able to branch out in different directions from the initial foldable power track 14 that connects to the base unit 12.

FIG. 5 shows a rapidly deployable floor power system 10 deployed in a room 34. As shown in FIG. 5, the rapidly deployable floor power system 10 includes multiple base units 12, each of which is connected to a set of foldable power tracks 14. As shown in FIG. 5, the foldable power tracks 14 can be placed on the floor in any desired spatial orientation relative to each other. There is no need for the foldable track sections 14 to be placed to be parallel to each other as shown in FIGS. 1, 3, and 4, but rather those figures were drawn with parallel track sections for ease of illustration. It will be recognized that the foldable power tracks 14 of a given rapidly deployable floor power system 10 may be oriented in any desired direction to provide power within a room 34 or other physical space. Thus, the rapidly deployable floor power system is easily configurable to create new power layout topologies as space is reconfigured. In some implementations sufficient power may be provided to a room using a single base unit. In other implementations multiple base units 12 may be used, for example, in a situation where a larger number of devices are to be provided with power within the room 34.

FIG. 6 is a functional block diagram of a dual ended magnetic power cable 32 having identical magnetic electrical connectors 18 at each end, each magnetic connector being designed to magnetically engage a base unit 12 and/or one or more foldable power track 14 according to an implementation.

Figure 7:
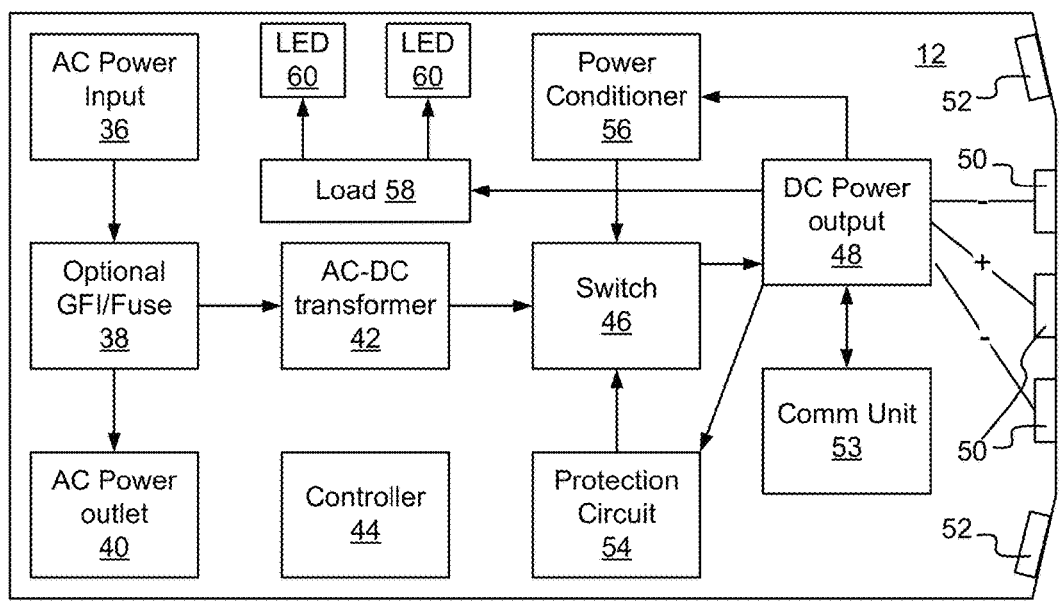
FIG. 7 is a functional block diagram of an example base unit according to an implementation.

FIG. 7 is a functional block diagram of one example implementation of a base unit 12. Multiple other implementations are possible and likewise the functional components shown in FIG. 7 may be rearranged depending on the functionality of the base unit and the particular implementation. Not all functions shown in FIG. 7 are necessary in every implementation. Likewise, a given implementation of a base unit may provide additional features. The functions described in connection with FIG. 7 may likewise be consolidated and multiple functions may be implemented using common components such as by a microprocessor or other processing environment.

In the implementation shown in FIG. 7 the base unit 12 includes an AC power input 36. The AC power input 36 is connected to an optional Ground Fault Interrupt (GFI) and/or fuse 38 to protect the base unit from an overcurrent or over voltage condition on the input AC power supply. Optionally, one or more AC power outlets 40 may be provided at the surface of the base unit 12 to enable the base unit 12 to also function as a power strip.

The base unit 12 receives AC power, such as mains electricity, and an AC-DC transformer 42 converts the received power into DC for output to the foldable power track. In some implementations, the AC-DC transformer 42 outputs 36 V DC power at 20 amps.

Power output from AC-DC transformer 42 flows through switch 46 to DC power output 48. The exterior shape of the DC power output 48 can have a profile similar to the track profile to be described in greater detail below. By forming the DC power output 48 to have the same exterior profile as the track, the same magnetic connector 18 can be used to connect to both the DC power output 48 of the base unit 12 and to the foldable power track 14. In some embodiments, the DC power output 48 includes three power contacts 50 spaced the same distance apart as track power contacts 62 on the rigid track sections 28 (described below).

The DC power output 48 also includes magnetic attractors 52 to enable the magnetic connector 18 to be magnetically attached to the base unit 12 in the area of the DC power output 48. Particularly where the exterior shell of the base unit is formed from a plastic or non-ferrous material, including magnetic attractors 52 allows the magnetic connector 18 to be mated to the base unit 12 and also serves to align the magnetic connector 18 with the DC power outlet 48 to ensure accurate mating between the power contacts 50 of the DC power outlet 48 and contacts of the magnetic connector 18. Optionally a lip may at least partially surround the DC power outlet 48 on the exterior shell of the base unit to further aid in aligning the magnetic connector 18 with the DC power outlet 48.

A protection circuit 54 is provided to detect an over-current condition on the DC power output. An over-current condition may occur where a short occurs across the exposed track power contacts 62 of the foldable power tracks 14. For example, a person may touch two of the exposed track power contacts 62 of opposite polarity, or a paperclip or other conductive object may come into contact with exposed track power contacts 62 of opposite polarity. In some implementations, the protection circuit 54 includes a shut-down circuit, for example as described in U.S. Pat. No. 7,932,638, to prevent a person from receiving an electrical shock if the person contacts both positive and neutral contacts of foldable power track 14, and to prevent the transmission of power to the foldable power track 14 in the event a conductive object comes into contact with both positive and neutral contacts. In some implementations the protection circuit senses the output power on DC power output 48 and activates switch 46 to turn off power on DC power output 48 until the condition has been remedied. Although the implementation shows the switch 46 interposed between the AC-DC transformer and the DC power output, the switch 46 may be elsewhere in the circuit, such as between the AC power input 36 and the AC-DC transformer.

A power conditioner 56 may optionally be provided in the base unit. The power conditioner, in one implementation, is formed to turn off power on the DC power output 48 until a power consumer has connected to the foldable power track 14. There is no reason to supply output power to the foldable power track 14 if no device is connected to the foldable power track to draw power from the floor power system. When a magnetic electrical connector 18 is connected to the foldable power track 14, the power conditioner 56 causes the switch to initiate transmission of power to the foldable power track 14. In some implementations the power conditioner 56 is implemented as a hot swap circuit.

In some implementations, the base unit 12 further includes a load sensor 58 to detect the amount of current being drawn from the DC power output 48. The load may be detected, as indicated, from the DC power output 48, from the output of the AC-DC transformer 42, from the protection circuit 54, or in another manner. The detected load is used to control operation of one or more LEDs 60. For example, in some implementations when AC power input 36 is connected to a power source, a first LED 60 is activated indicating that the base unit 12 is receiving power. When the amount of power drawn by devices connected to the flexible power track 14 starts to approach the power limit of the base unit 12, a second LED 60 is illuminated. Other LEDs may likewise be provided to indicate other power conditions.

In some implementations, the base unit 12 includes a controller 44 or microprocessor to implement some of the functions of the protection circuit 54, power conditioner 56, and/or load sensor 58.

Figure 8:
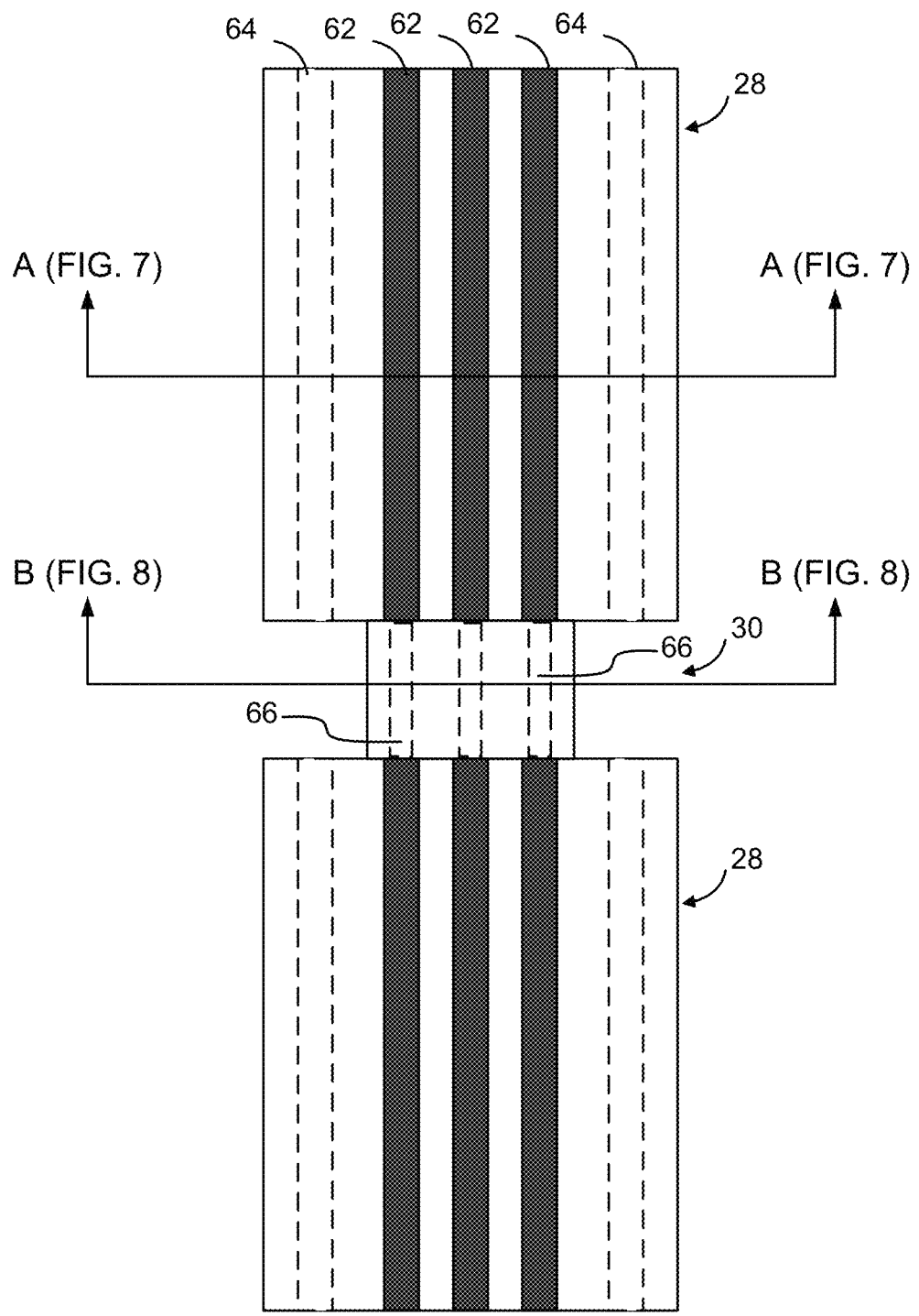
FIG. 8 is a top plan view of two sections of an example foldable power track according to an implementation.
Figure 9:
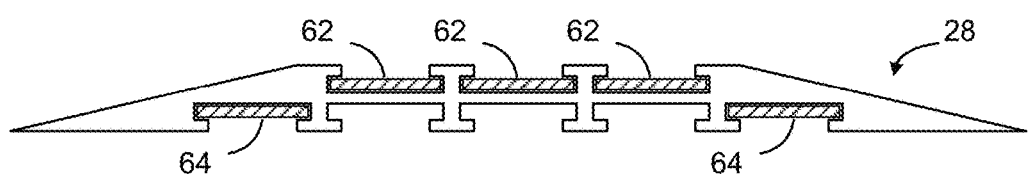
FIG. 9 is a cross-sectional view of rigid track section taken along line A-A of FIG. 8 according to an implementation.
Figure 10:
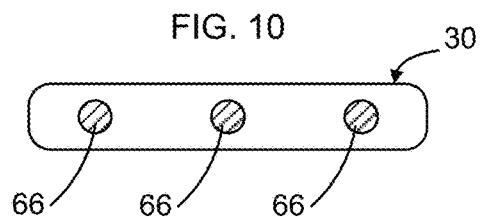
FIG. 10 is a cross-sectional view of a flexible connector taken along line B-B of FIG. 8 according to an implementation.

FIG. 8 is a top plan view of two sections of an example foldable power track 14 according to an implementation. FIG. 9 is a cross-sectional view of a rigid track section 28 of the foldable power track 14 taken along line A-A of FIG. 8 according to an implementation. FIG. 10 is a cross-sectional view of a flexible track connector 30 of the foldable power track 14 taken along line B-B of FIG. 8 according to an implementation.

As shown in FIGS. 8-10, the foldable power track 14 includes rigid track sections 28 interconnected by flexible track connectors 30. The rigid track sections 28 have exposed power contacts 62 extending along their upper surface. Magnetic attractors 64 are formed along outside edges of the rigid track sections 28 to enable the magnetic connectors 18 to magnetically engage the rigid track sections 28 of the foldable power track 14. Wires 66 disposed within flexible track connectors 30 electrically connect the power contacts 62 of one rigid track section 28 to the next rigid track section 28, so that power supplied to one rigid track section 28 will be conducted the length of the foldable power track 14.

Figure 11:
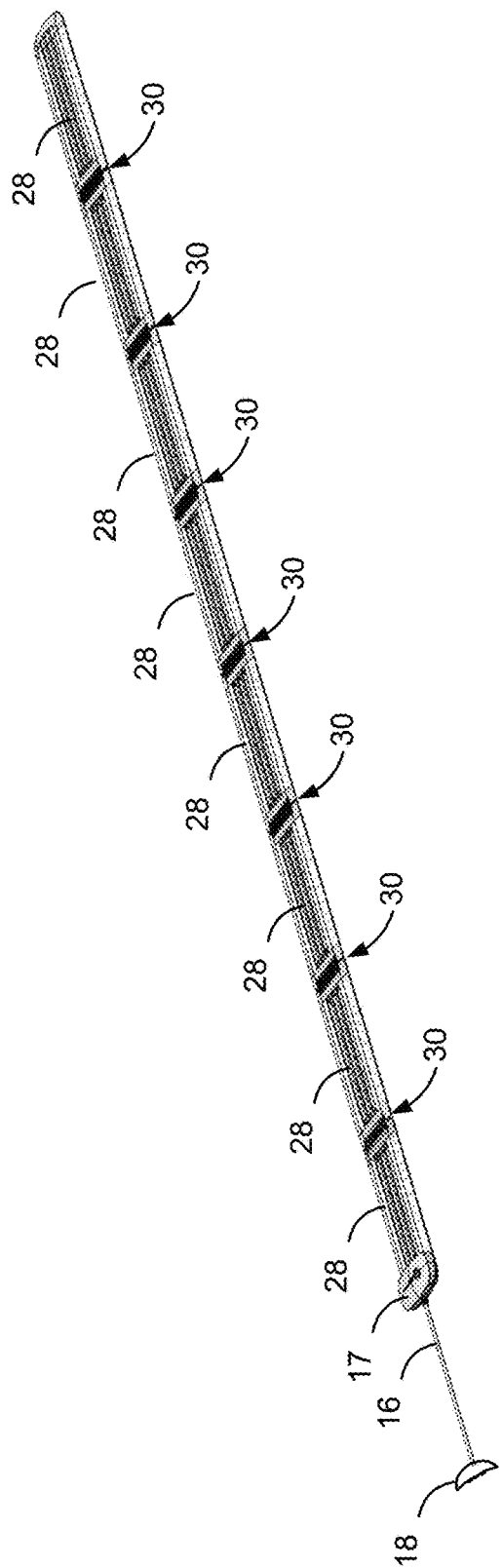
FIG. 11 is a perspective view of an example foldable power track for use with the example floor power system of FIG. 1.

FIG. 11 is a perspective view of an example foldable power track 14 according to an implementation. As shown in FIG. 11, the foldable power track 14 includes a plurality of rigid track sections 28 interconnected by flexible track connectors 30. The foldable power track 14 shown in FIG. 11 includes eight rigid track sections 28 interconnected by seven flexible track connectors 30. In other implementations different numbers of rigid track sections 28 and flexible track connectors 30 may be used. Rigid track sections 28 may be of any desired length. In some implementations the rigid track sections 28 are between 1-4 feet in length, although other length rigid track sections 28 may likewise be used depending on the implementation. Rigid track sections 28 of a given foldable power track 14 may be all of the same length or, alternatively, may have different lengths. The width of the rigid track sections 28 may be on the order of 3-6 inches wide, or another width depending on the implementation.

Figure 12:
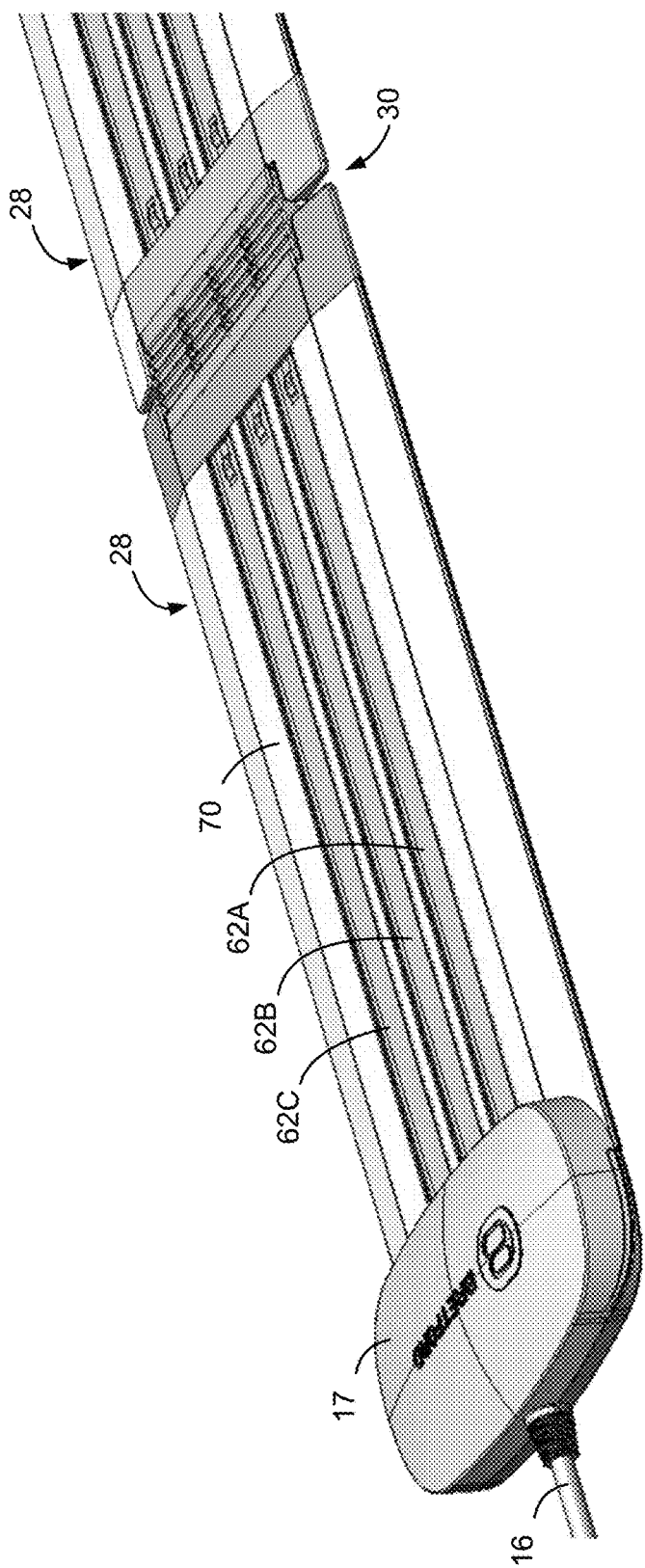
FIG. 12 is a perspective view of a power input end of the example foldable power track of FIG. 11.
Figure 13:
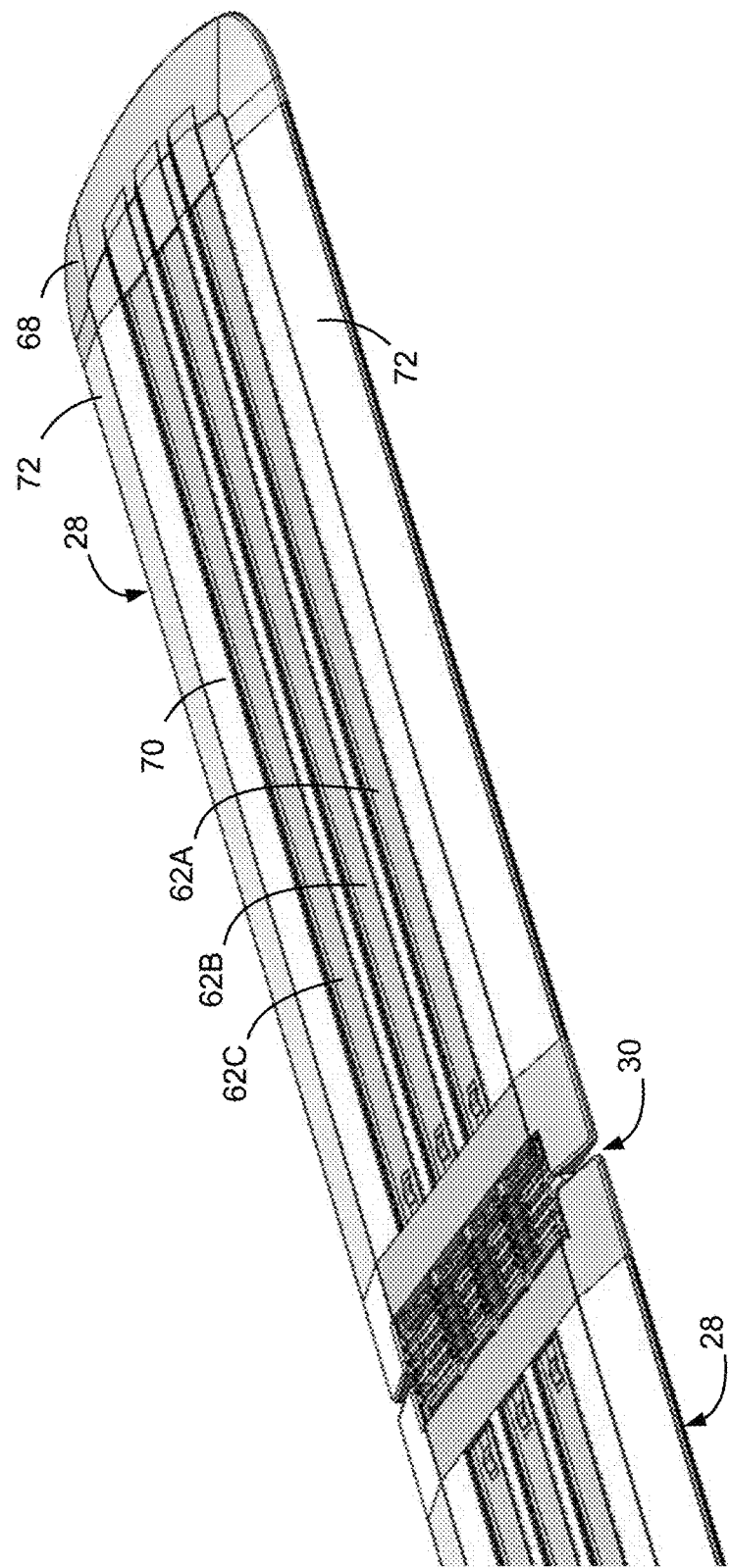
FIG. 13 is a perspective view of a termination end of the example foldable power track of FIG. 11.

FIG. 12 is a perspective view of a track input terminal 17 of the example foldable power track of FIG. 11, and FIG. 13 is a perspective view of a termination end 68 of the example foldable power track of FIG. 11. As shown in FIG. 12, power enters the track input terminal 17 of the foldable power track 14 via track power cable 16 and is distributed by track input terminal 17 to track power contacts 62A, 62B, 62C.

In some implementations, track power contacts 62A, 62B, 62C are formed as aluminum plates that are accessible along their length from a top surface 70 of the rigid track section 28. Although aluminum is a preferred material for formation of track power contacts 62, other materials such as copper may likewise be used. The particular material selected for track power contacts 62 will depend on the amount of power to be delivered by the track power contacts 62 as well as the dimensions of the track power contacts 62.

In some implementations the track power contacts 62A, 62B, 62C extend substantially the entire length of each of the rigid track sections 28. In some implementations the track power contacts 62A, 62B, 62C extend the entire length of each of the rigid track sections 28. As shown in FIG. 12, each track section has a set of track power contacts 62A, 62B, 62C which extend along its top surface 70. Having track power contacts 62A, 62B, 62C exposed on the top surface 70 of the rigid track section 28 along the length of the rigid track section 28 enables multiple electrical connections to be made to the track power contacts 62A, 62B, 62C along the length of the foldable power track 14, and allows variability as to where the electrical connection should be made.

In some embodiments, track power contacts 62A and 62C are used as ground, and track power contact 62B is positive. As noted above, in some embodiments the voltage difference between positive and ground may be 36 volts DC. In other embodiments, other voltage levels may be used. In other embodiments, track power contacts 62A and 62C may be positive and track power contact 62B may be ground. In still another embodiment, a first of the track power contacts may be used as ground, a second of the track power contacts may be used to carry positive DC power at a first voltage level, and a third of the track power contacts may be used to carry positive DC power at a second voltage level. In addition to supplying DC power on the track power contacts 62A, 62B, 62C, in some implementations communication signals are also transmitted on one or more of the track power contacts. In some implementations transmission of data signals on one or more of the track power contacts 62 may be implemented via signals overlayed on the DC voltage on any one or more of the track power contacts 62. In other implementations one of the track power contacts 62 is used as a dedicated data channel.

In some implementations communication between the base unit and other components within the rapidly deployable floor power system is implemented using passive communication, such as by causing the base unit to sense power conditions on the track. For example, in some implementations the base unit senses power conditions on power contacts 50 as power distribution systems are connected within the rapidly deployable floor power system to verify that the power distribution system is an approved load. In some implementations RC time constants are used to implement this communication. For example, in some implementations, the base unit uses a known time constant and a forward voltage drop across a diode to verify an "approved" load.

Although the implementation shown in FIG. 12 shows the track power contacts 62A, 62B, 62C as having the same surface area, in some implementations the track power contacts 62 may have different widths.

As shown in FIG. 13, the termination end 68 in some implementations is rounded and beveled to minimizing tripping hazard presented by the foldable power track 14. In some implementations, the foldable power track 14 likewise has beveled edges 72 extending from floor level to the top surface 70 to minimize tripping hazard presented by the foldable power track 14, and to enable wheeled items to more easily roll over the foldable power track.

Figure 14:
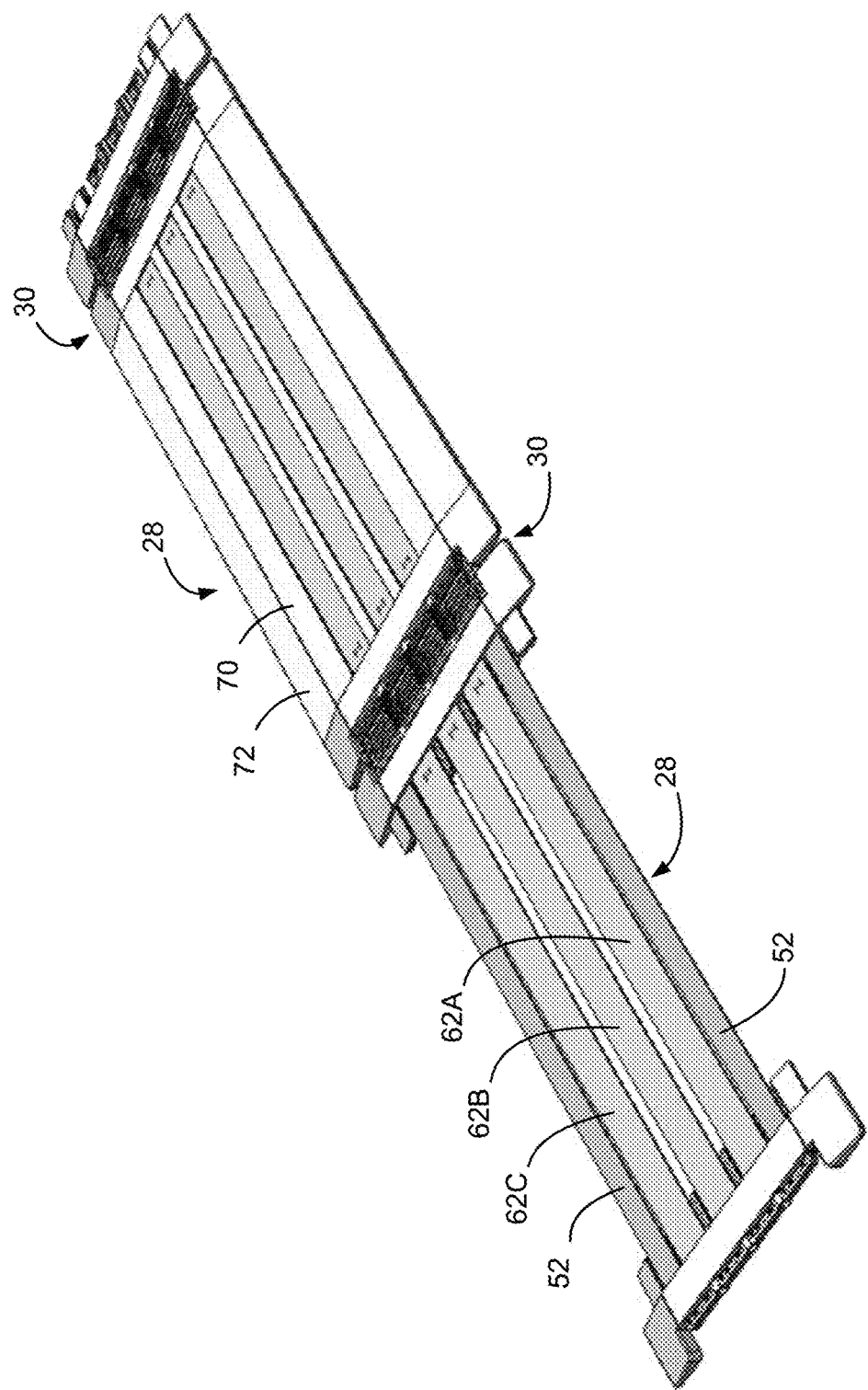
FIG. 14 is a perspective view, in partial relief, of two sections of the example foldable power track of FIG. 11.

FIG. 14 is a perspective view, in partial relief, of two rigid track sections 28 of the example foldable power track of FIG. 11. As shown in FIG. 14, in some implementations each rigid track section 28 has three track power contacts 62 and two magnetic attractors 64. Magnetic attractors 64, in some implementations, are rods or bars of ferromagnetic materials extending the length of the rigid track section 28. In some implementations a ferromagnetic bar, such as an iron plate or steel plate is disposed in a channel adjacent each beveled edge 72.

FIGS. 15-16 show an example cross-sectional views of an example rigid track section 28. FIG. 15 shows the rigid track section 28 including the track power contacts 62A, 62B, 62C, as well as magnetic attractors 64. FIG. 16 shows the rigid track section 28 alone, with the power track power contacts 62A, 62B, 62C, and magnetic attractors 64 removed. As shown in FIGS. 15-16, in some implementations the rigid track section 28 is formed from extruded plastic having a plurality of channels 74 for receiving the track power contacts 62A, 62B, 62C, and magnetic attractors 64. Channels 74 also serve to receive tongues 92 of the rigid tail pieces of the flexible track connector 30 (described below).

The height of the rigid track sections 28, in some implementations, is on the order of ¼ inch. Minimizing the height profile of the rigid track sections 28 when deployed on the floor is advantageous to prevent tripping. The height, in some implementations, is dependent on the ability to mechanically interconnect the flexible track connectors 30 with adjacent rigid track section 28. Optionally an elastomer may be applied to a lower surface of the rigid track sections 28 to prevent the rigid track sections 28 from slipping when deployed.

In some embodiments the magnetic attractors 64 are retained within a body of the rigid track section 28 by magnetic attractor grooves 76. For example, ferromagnetic bars may be slid into the magnetic attractor grooves 76 of channels 74B and 74E prior to connecting the rigid track section 28 to flexile track connectors 28.

In some embodiments, track power contacts 62A, 62B, 62C are retained by power contact grooves 78 formed along edges of power contact channels 80A, 80B, and 80C formed in the top surface 70 of the rigid track section 28. For example, aluminum bars may be slid into the power contact grooves 78 of the power contact channels 80A, 80B, 80C prior to connecting the rigid track section 28 to flexible track connectors 30.

As shown in FIG. 15, in some implementations the track power contacts 62A, 62B, 62C are formed to sit slightly below the top surface 70 of the rigid track section 28. By recessing the track power contacts 62 slightly below the top surface 70 of the rigid track section 28, a paperclip or other metallic/conductive item that happens to fall onto the top surface 70 is less likely to form an electrical connection between adjacent track power contacts 62 and, hence, the track is less likely to short out.

Figure 17:
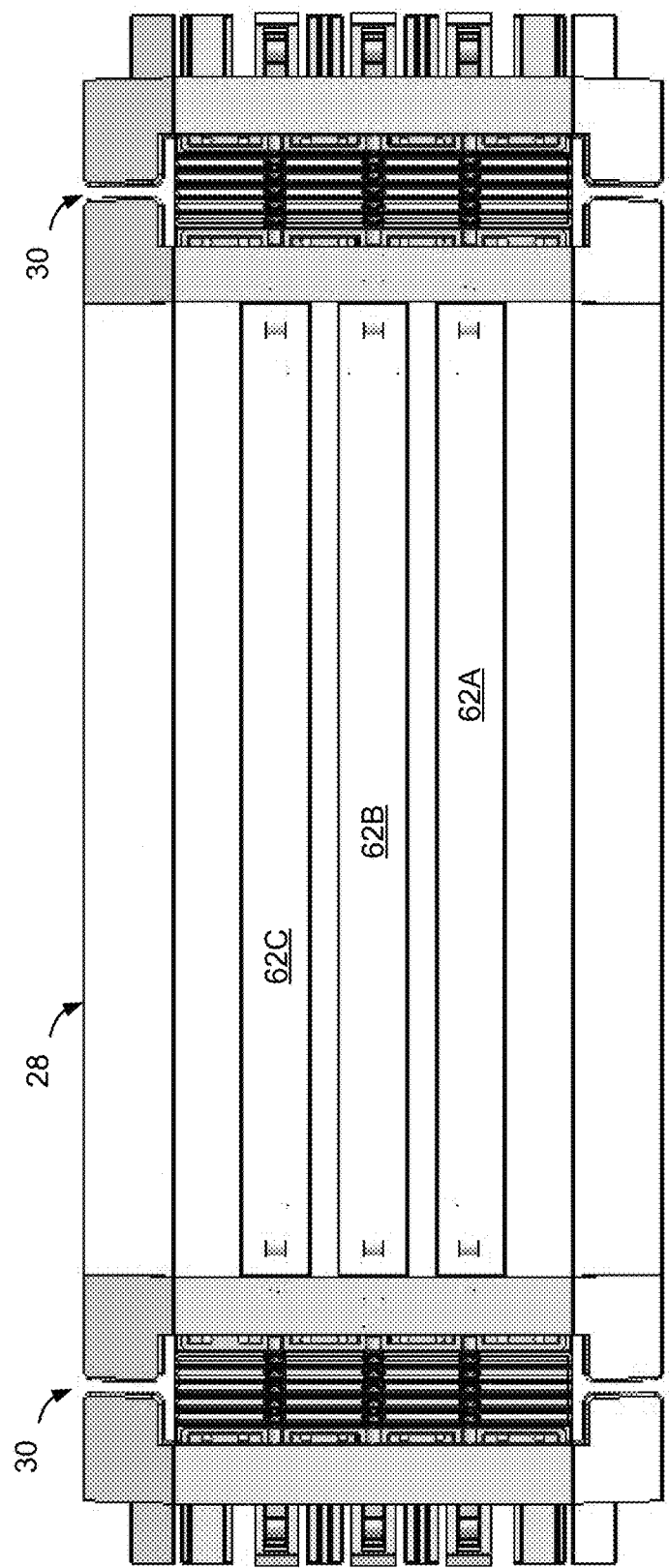
FIG. 17 is a top plan view of one rigid track section of the example foldable power track of FIG. 11.

FIG. 17 shows an example rigid track section 28 with two attached flexible track connectors 30. During manufacturing, the body of the rigid track section 28 is extruded, power contacts 62 are inserted as discussed above, and magnetic attractors are inserted as discussed above. Flexible track connectors 30 are then attached to the rigid track section 28, for example by inserting tongues 92 into channels 74.

Figure 18:
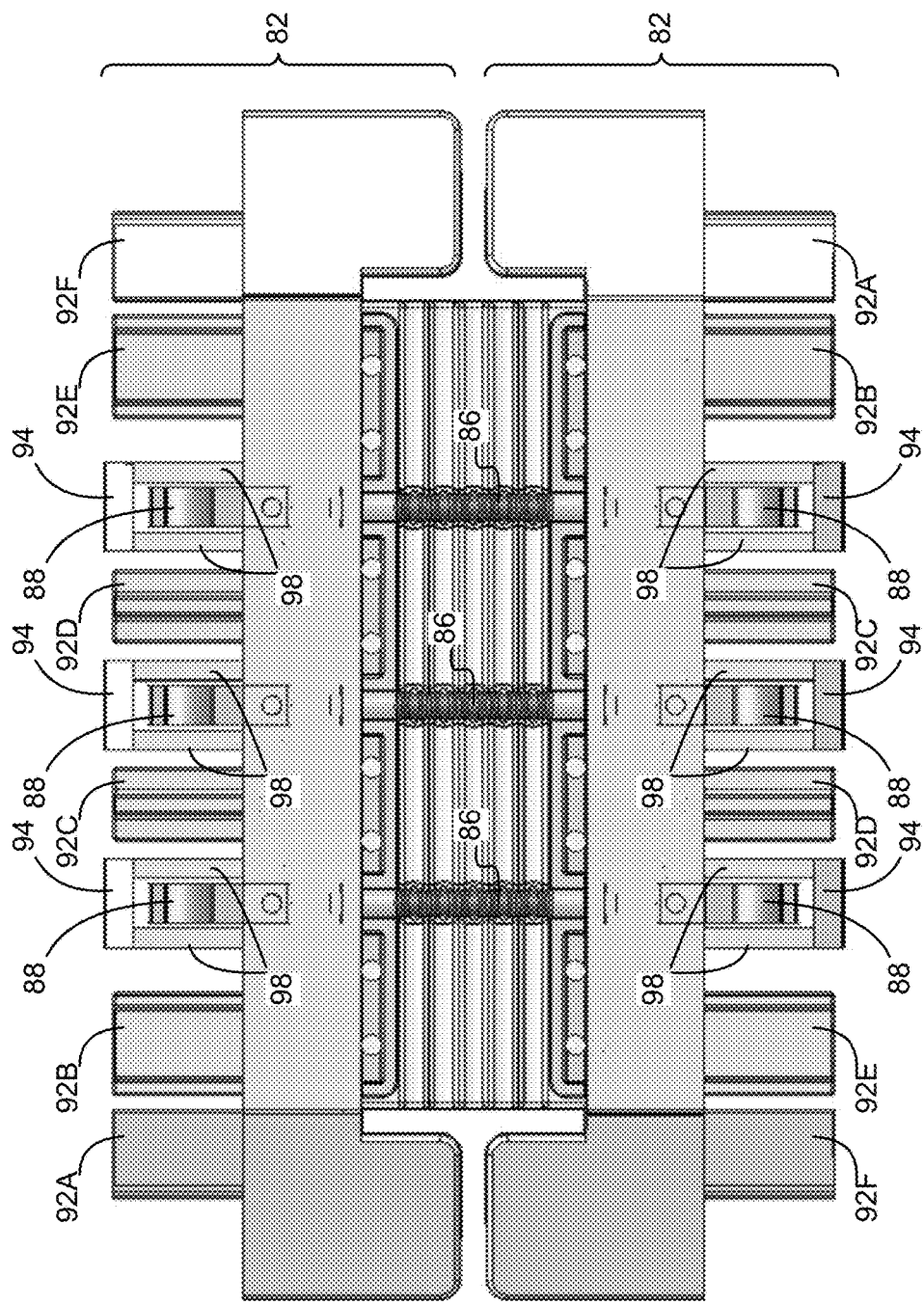
FIG. 18 is a top plan view of an example flexible track connector used to connect adjacent rigid track sections of the example foldable power track of FIG. 11.
Figure 19:
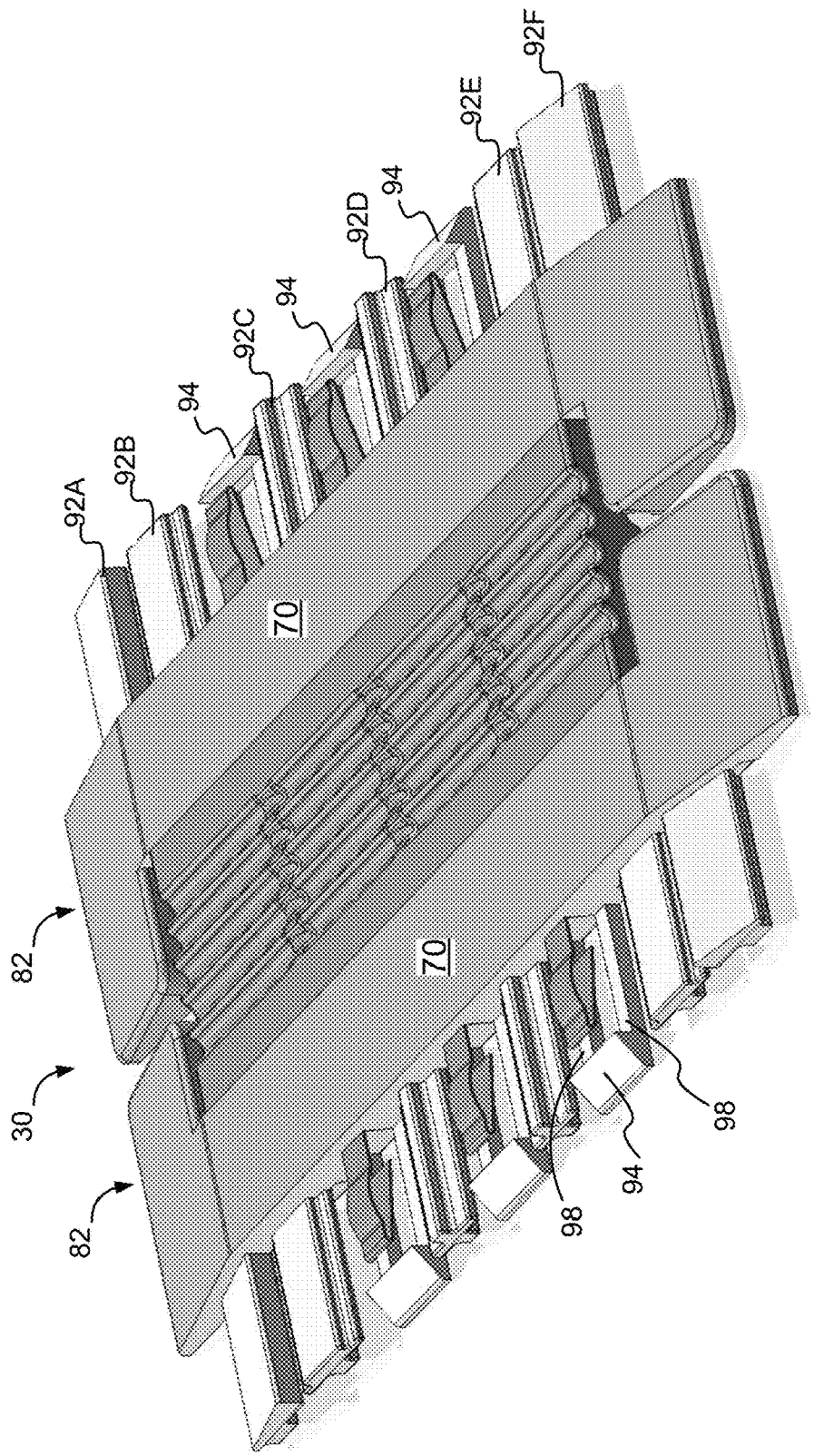
FIG. 19 is a perspective view of the example flexible track connector of FIG. 18.

FIGS. 18 and 19 show an example flexible track connector 30 in greater detail. As shown in FIG. 18, in some implementations the flexible track connector 30 has rigid tail pieces 82 interconnected by a flexible ribbon 84. Electrical connectors 86 extend between the rigid tail pieces 82 through the flexible ribbon 84. In some implementations each electrical connector 86 has a brass tip 88 at each end interconnected by a jacketed wire 90. The jacketed wire 90 may be, for example, a 12 or 14 gauge copper wire that is soldered on each end to brass tips 88.

Each rigid tail piece 82 has tongues 92A-92F that are shaped to fit into corresponding openings 74A-74F of the extruded the track body (see FIG. 15). Insertion of tongues 92A-92F into openings 74A-74F maintains alignment of the top surface 70 of the track with the top surface of the rigid tail piece 82.

Each rigid tail piece 82 also has retaining clasps 94 having wedge-shaped tips that engage with corresponding apertures (not shown) formed in the track body when the tongues 92A-92F are inserted into corresponding openings 74A-75F of the track body. Wedges thus mechanically connect the rigid tail pieces 82 to the rigid track sections 28.

During assembly, the wedge-shaped retaining clasps 94 will slide under regions 96 (see FIG. 15) causing legs 98 of the retaining clasps 94 to bend slightly. When the wedge-shaped tips encounter the apertures in the region 76, the legs 98 will snap back into place causing the wedge-shaped tips to engage the apertures to mechanically connect the rigid tail piece 82 to the track body. Although a mechanical connection has been described, other manners of connecting the rigid tail piece 82 to the track body may be utilized as well, such as through the use of adhesives or ultrasonic welding.

Figure 20:
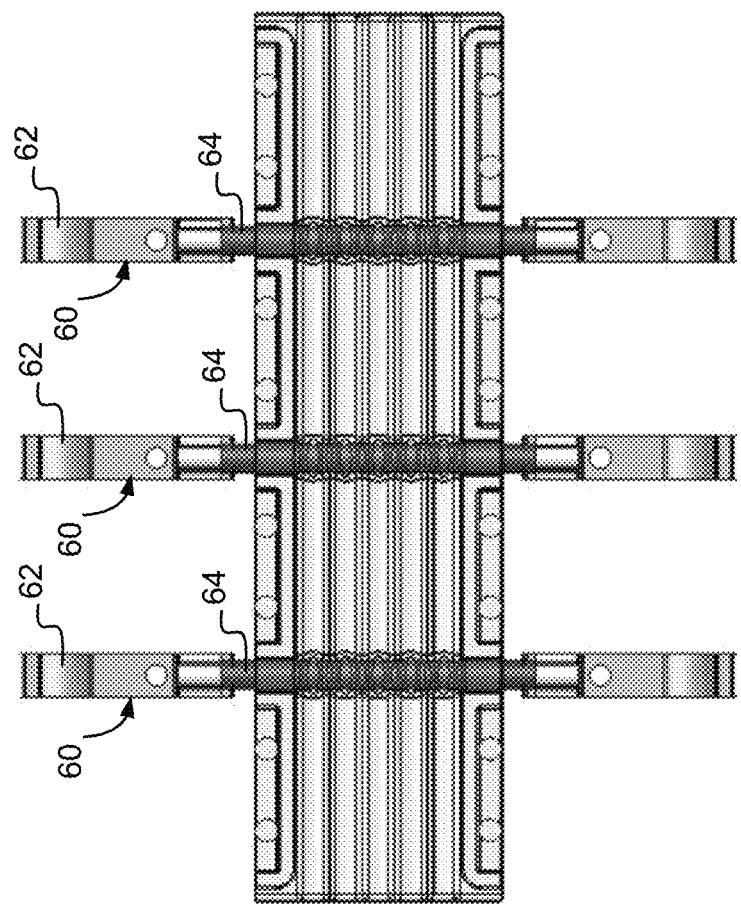
FIG. 20 is a top plan view of embedded electrical components of the example flexible track connector of FIG. 18.

FIG. 20 shows the flexible ribbon 84 and electrical connectors 86 in greater detail. As shown in FIG. 20, the flexible ribbon 84 is formed as a pliable sheet substantially the width of the top surface 70 of the rigid track section 28, and is molded around jacketed wires 90 of electrical connectors 86. Preferably a material such as Thermo-Plastic Urethane (TPU) is used, which may be injection molded around jacketed wires 90.

In some implementations, the rigid tail pieces 82 are first injection molded using a relatively rigid plastic material such as polycarbonate. Two identical tail pieces are then brought to a second molding process, in which the TPU is injection molded around the wires 90 and stubs formed on the rigid tail pieces 82. By injection molding the TPU of the flexible ribbon 84 to engage the stubs of the rigid tail pieces 82, it is possible to securely join the rigid tail pieces 82 with the flexible ribbon 84.

Figure 21:
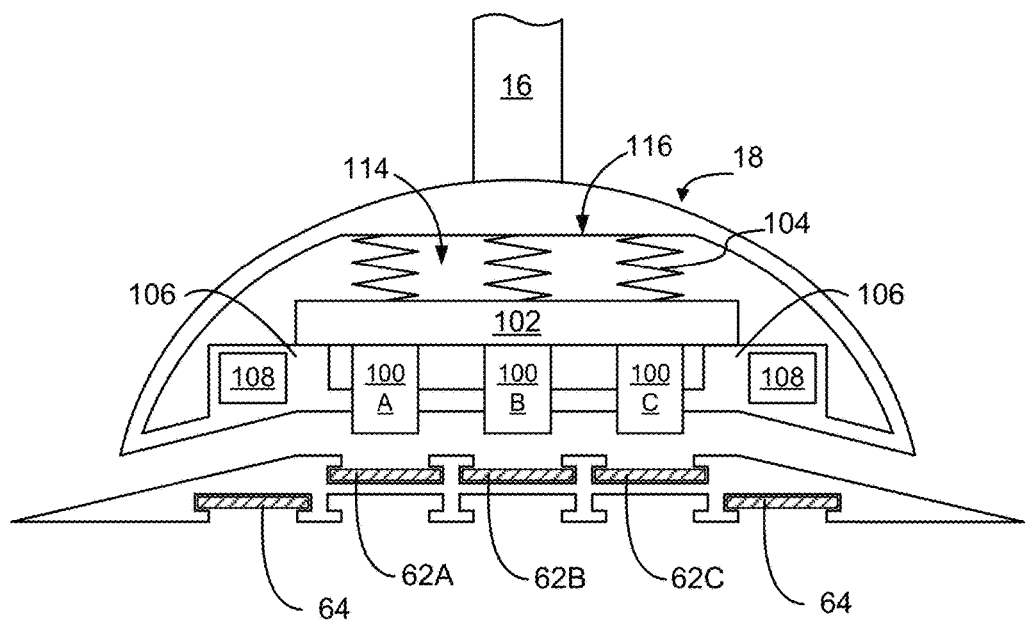
FIG. 21 is a cross-sectional view of a magnetic electrical connector in close proximity to example rigid track section.
Figure 22:
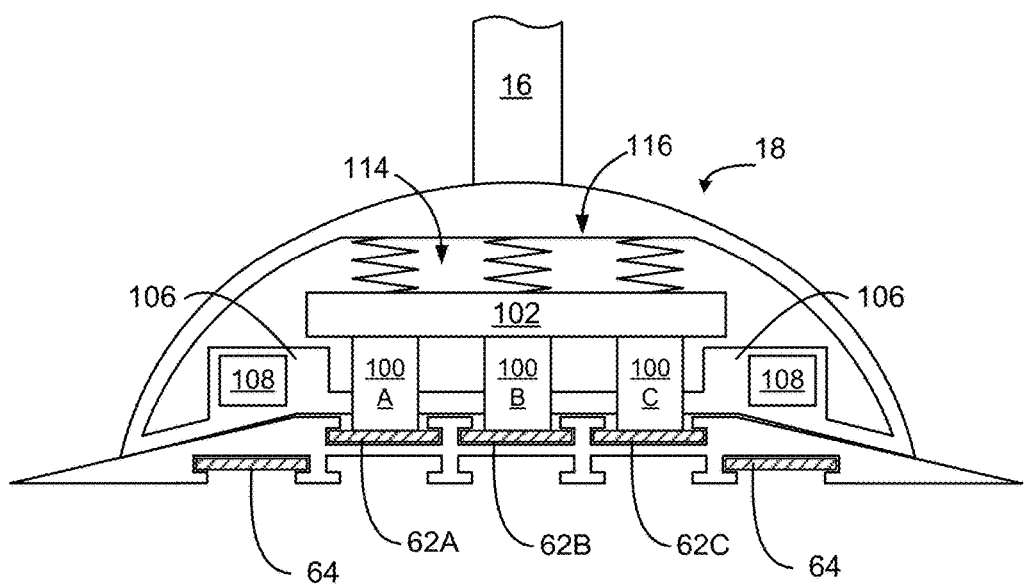
FIG. 22 is a cross-sectional view of the magnetic electrical connector of FIG. 21 in electrical communication with the example rigid track section.

FIG. 21 is a cross-sectional view of an example magnetic connector 18 configured to electrically connect with the track power contacts 62 of an example rigid track section 28, when the magnetic connector 18 is in close proximity to the example rigid track section 28 and before making contact with the rigid track section 28. FIG. 22 is a cross-sectional view of the magnetic connector 18 once the magnetic connector 18 has mated with the example rigid track section 28.

As shown in FIG. 21, in one implementation the magnetic connector 18 has three contacts 100A, 100B, 100C spaced to respectively engage power contacts 62A, 62B, 62C of the rigid track section 28. Contacts 100 may be formed of copper, aluminum, or another conductive material, and in some implementations have planar bottom surfaces to engage power contacts 62A, 62B, 62C of rigid track section 28.

The three contacts 100A, 100B, 100C, in one implementation, are rigidly attached to a printed circuit board 102 that is biased downward by springs 104 to extend out of a lower surface of the magnetic connector 18. Printed circuit board 102 can move relative to base 106 such that, when contacts 100 engage track power contacts 62, the printed circuit board is moved upward into the magnetic connector 18 against the force of the springs 104. Magnets 108 in magnetic connector 18 are attracted to magnetic attractors 64 to pull the body of the magnetic connector 18 into engagement with rigid track section 28. Contacts 100 initially extend outward from a bottom surface of the magnetic connector. The force of the magnets pulls the bottom surface of the magnetic connector against the top surface 70 of the rigid track section 28, which also causes contacts 62 to force contacts 100 upward into the magnetic connector 18 against the force of the springs 104. In this manner springs 104 are able to urge contacts 100 into firm engagement with track power contacts 62. Magnets 108 also ensure alignment of the contacts 100 of magnetic connector 18 and with contacts 62 of the rigid track section 28.

Figure 23:
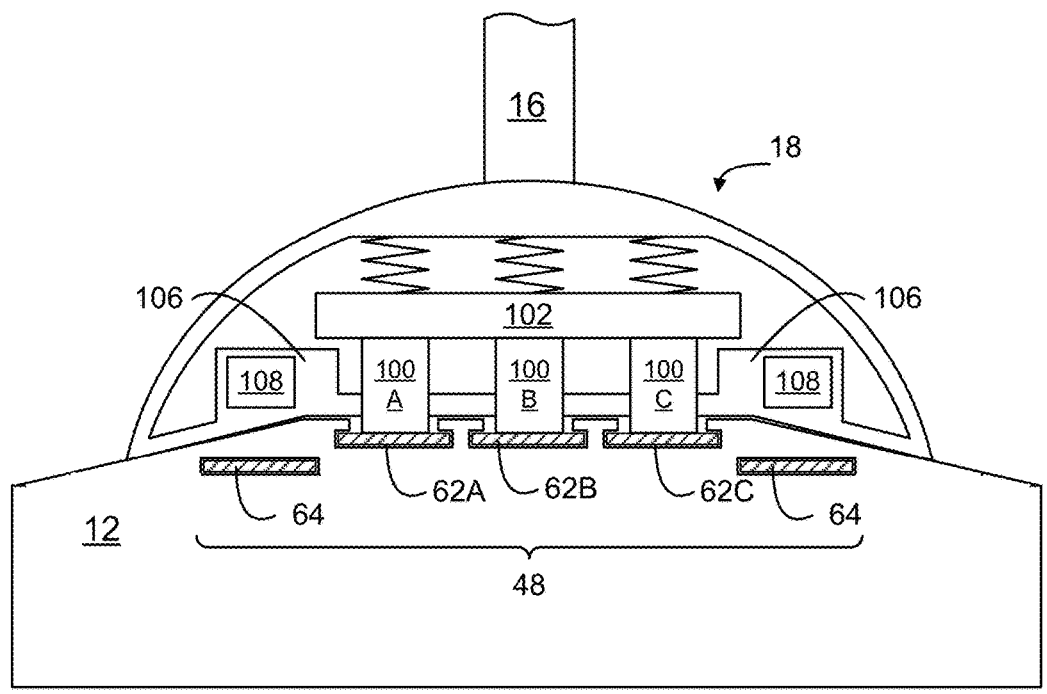
FIG. 23 is a cross-sectional view of the magnetic electrical connector of FIG. 21 in electrical communication with an example base unit.

FIG. 23 is a cross-sectional view of the example magnetic connector 18 configured to electrically connect with a DC power output interface 48 of a base unit 12. As shown in FIG. 23, in some embodiments the base unit 12 has a DC power output interface 48 having external surface shaped with the same profile as the rigid track section 28, and has power output contacts 50A, 50B, 50C spaced to have the same relative spacing as the spacing of the track power contacts 62A, 62B, 62C. Magnetic attractors 52 are likewise provided in the base unit 12 to enable the magnetic connector 18 to magnetically engage with the base unit 12 in the same manner as the magnetic connector 18 engages with the rigid track sections 28 of the flexible power track 14.

Figure 24:
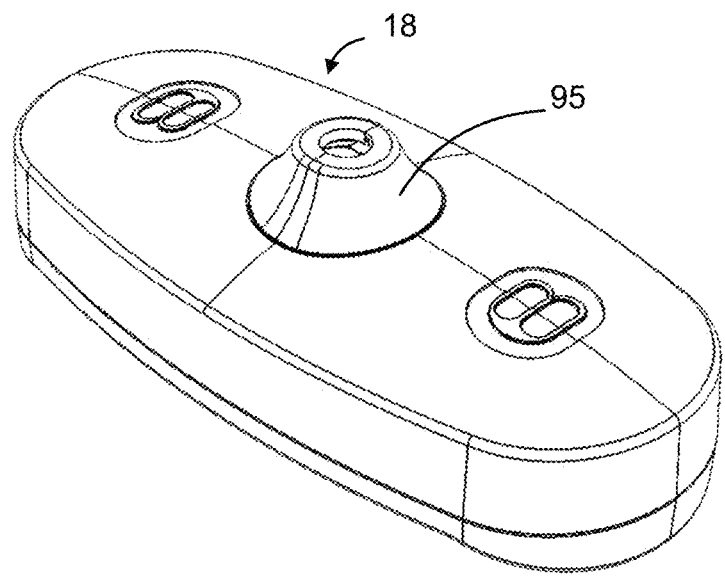
FIG. 24 is a perspective view of an example magnetic electrical connector according to an implementation.

FIGS. 24-28 show an implementation of a magnetic electrical connector 18. As shown in FIG. 24, in some implementations the magnetic electrical connector 18 has a strain relief member 95 formed where the magnetic electrical connector 18 is connected to the power distribution cable 22. In some implementations the strain relief member 95 may be made of translucent plastic to light up when the magnetic electrical connector 18 is properly connected to the foldable power track 14 and receiving power from the base unit 12. Optionally printed circuit board 102 may include one or more LEDs (not shown) that output light when power is present.

Figure 25:
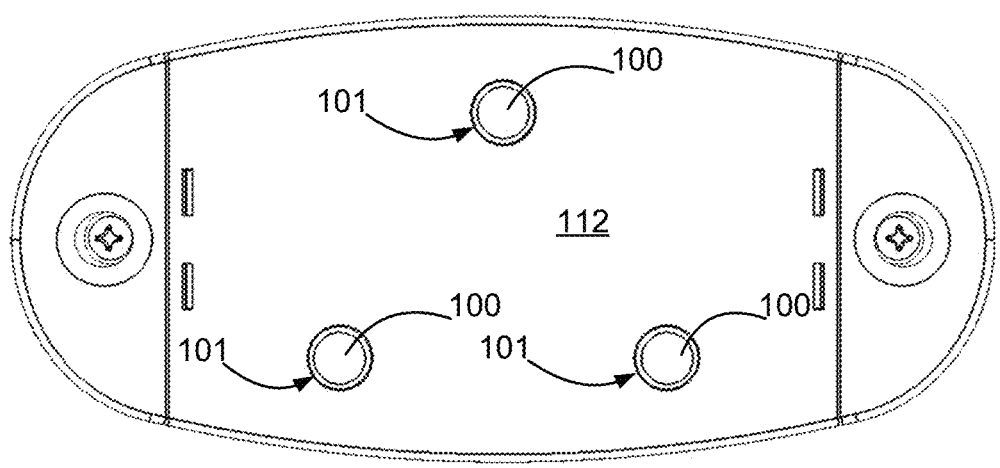
FIG. 25 is a bottom view of the example magnetic electrical connector of FIG. 24.
Figure 41:
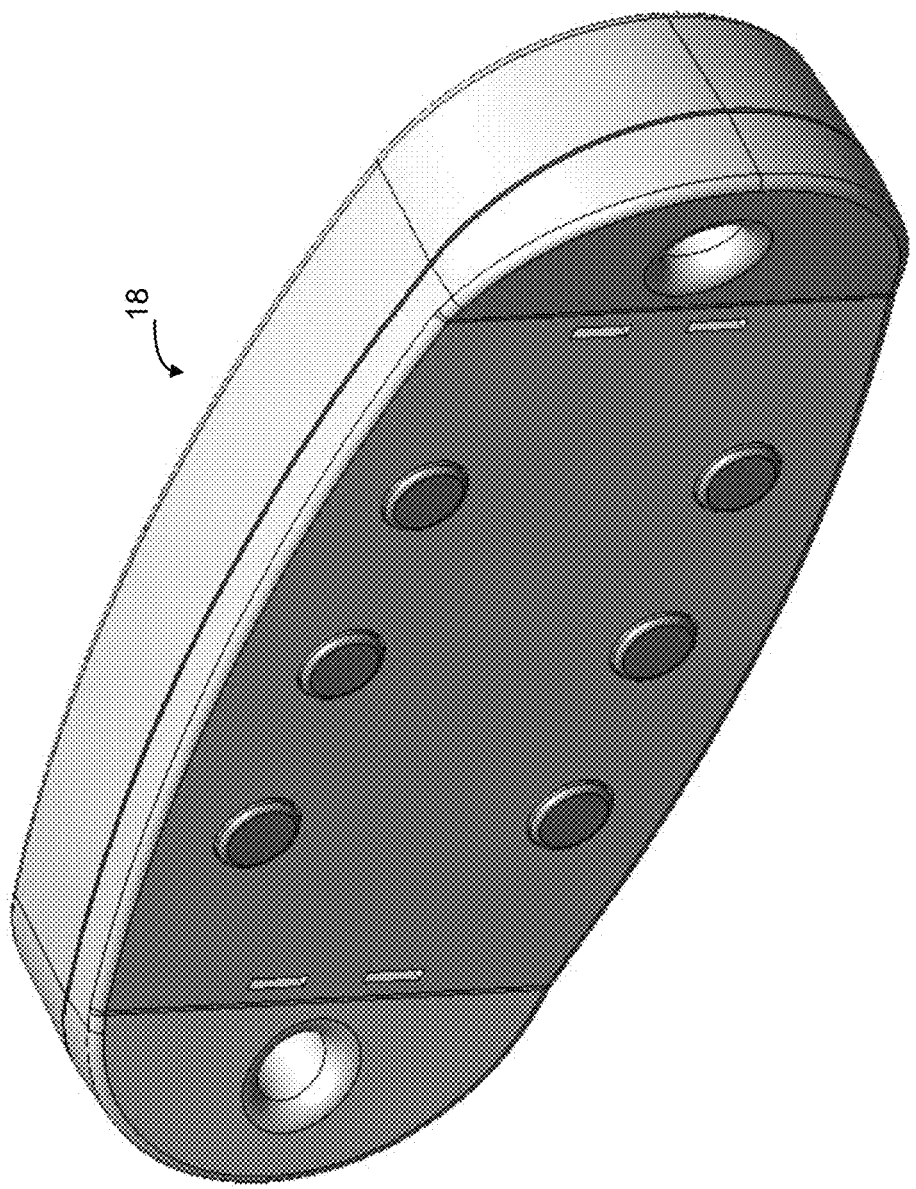
FIG. 41 is a bottom perspective view of the magnetic connector of FIG. 40.

FIG. 25 shows a lower surface 112 of the magnetic electrical connector 18. As shown in FIG. 25, in some implementations the lower surface 112 includes three apertures 101 through which contacts 100 extend. In other implementations, for example as shown in FIG. 41, the magnetic electrical connector 18 has six contacts 100 instead of the illustrated three contacts 100 shown in FIG. 25. Use of a larger number of contacts 100 may enable greater power transfer between contacts 100 of the magnetic electrical connector 18 and the track power contacts 62. In some implementations, magnetic electrical connectors 18 connected to track power cables 16 have six contacts 100, so that the magnetic electrical connectors 18 used to receive power from the base unit 12 and to transfer power between daisy-chained foldable power tracks 14 are provided with a higher surface area for transfer the relatively higher power flowing through these connections. In some implementations the magnetic electrical connectors 18 connected to power distribution cable 22 have three contacts 100, as shown in FIG. 25, due to the reduced amount of power required to be handled in the connections associated with providing power from the foldable power track 14 to the power distribution units 24.

Figure 26:
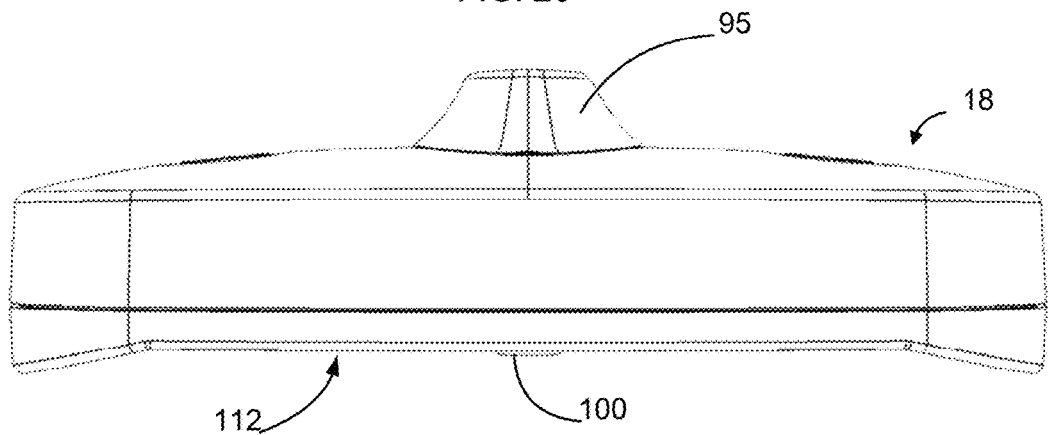
FIG. 26 is a front view of the example magnetic electrical connector of FIG. 24, the rear view being a mirror image of the front.

As shown in FIG. 26, in some embodiments the lower surface 112 of the magnetic electrical connector 18 has a profile to match the profile of the upper surface 40 of the rigid track sections 28 of the foldable power track 14.

Figure 27:
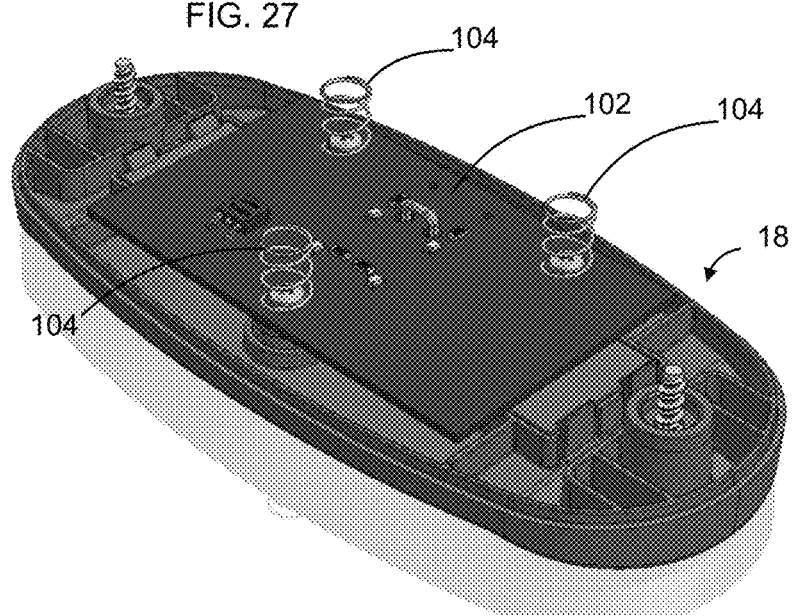
FIG. 27 is a perspective view of an interior of the magnetic electrical connector of FIG. 24 with the top cover removed.
Figure 28:
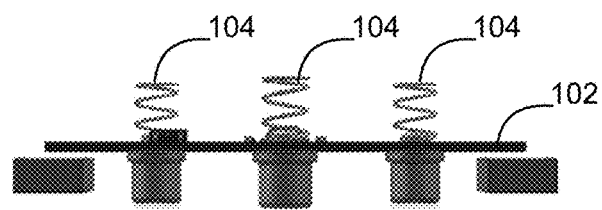
FIG. 28 is a front view of the example magnetic electrical connector of FIG. 24 with the top cover and bottom covers removed.

FIGS. 27 and 28 show one arrangement of the printed circuit board 102, contacts 100, and springs 104 of an example magnetic electrical connector 18. As shown in FIGS. 27 and 28, in one implementation the contacts 100 are screwed onto printed circuit board 102. Springs 104 are positioned directly opposite the contacts 100 and optionally are likewise connected to the printed circuit board using the same screw that is used to hold the contacts 100 on the printed circuit board. Springs 104 bias the printed circuit board 102 away from a top interior surface 114 of a cavity 116 formed within the magnetic electrical connector 18 (see FIG. 21). The body of the magnetic electrical connector 18, in some embodiments, is formed of plastic and, as such, does not conduct electricity. Accordingly, the fact that the springs 104 are in electrical communication with contacts 100 does not result in a short circuit between the various contacts within the magnetic electrical connector. Wires (not shown) of cable 12 or cable 22 are connected to the printed circuit board.

FIGS. 29-31 are functional block diagrams of example power distribution units 24 connected by cable 22 with a magnetic electrical connector 18 to receive power from the foldable power track 14. FIGS. 29-30 show an implementation in which the power distribution unit 24 includes a plurality of female low voltage DC output ports 122. Example DC output ports 122 may be USB ports. FIG. 31 shows an implementation in which the power distribution unit 24 includes a plurality of power whips 124, each of which is equipped with a DC connector 126, such as a cylindrical plug, for supplying power, e.g., to a laptop computer.

Figure 32:
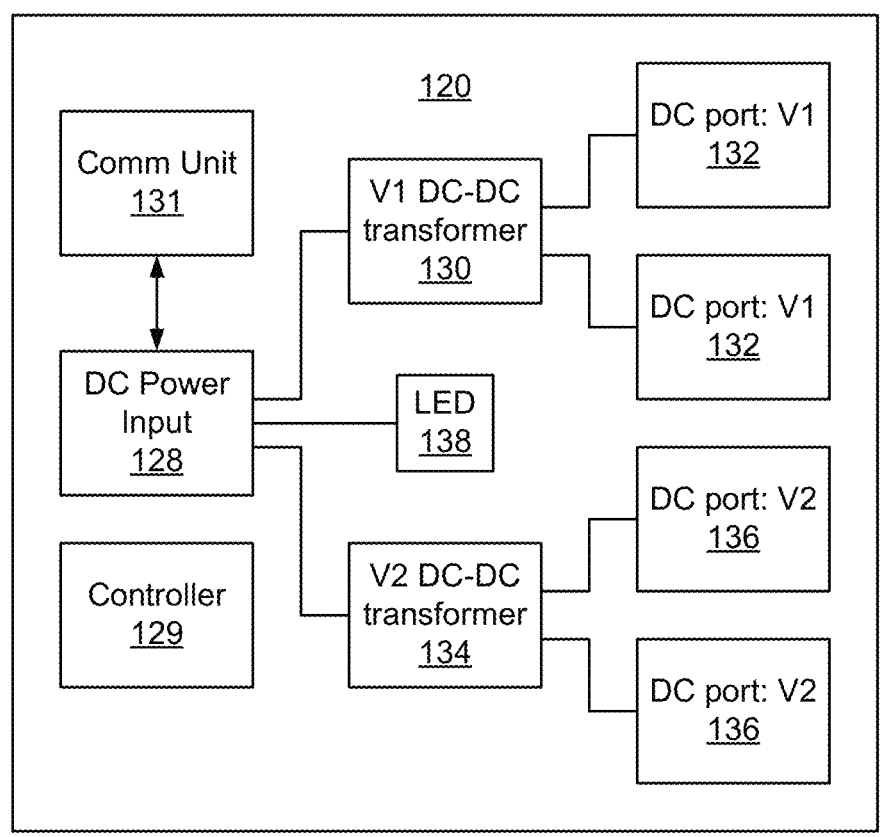
FIG. 32 is a functional block diagram of an example power distribution unit according to an implementation.

FIG. 32 is a functional block diagram of an example power distribution unit 24 according to an implementation. As shown in FIG. 32, the power distribution unit 24 has a DC power input 128. A first DC-DC transformer 130 converts DC power received at DC power input 128 to a first voltage level for presentation at a first set of DC ports 132. In some implementations the first voltage level is 5 V DC and the first set of DC ports 132 are USB ports. Although FIG. 32 shows two first DC ports 132, a larger or smaller number of ports may be used depending on the implementation.

Optionally a second DC-DC transformer 134 converts DC power received at DC power input 128 to a second voltage level for presentation at a second set of DC ports 136. In some implementations the second voltage level is 20 V DC and the second set of DC ports 136 are DC connectors 126 such as cylindrical DC connectors on ends of power whips 124. Although FIG. 32 shows two second DC ports 136, a larger or smaller number of ports may be used depending on the implementation. Optionally one or more LEDs 138 may be provided to indicate when power is connected to the power distribution unit 24.

In some implementations, the power distribution unit 24 includes a controller or microprocessor 129 to manage the functions of the power distribution unit 24. In some implementations, the base unit has a first communication unit 53 and the power distribution unit 24 has a second communication unit 131. In some implementations, the first communication unit 53 and the second communication unit 131 use at least one of the three exposed track power contacts 62 of the foldable track 14 to pass communication signals between the first communication unit 53 and the second communication unit 131. Optionally, the base unit controller 44 can verify, via the communication signals, whether the power distribution unit 24 is authorized to receive power from the foldable power track 14. If the power distribution unit 24 is not authorized to receive power from the foldable power track 14, the base unit controller 44 can turn off switch 46 to cease supplying power to the foldable power track 14.

In some implementations, a third communication unit (not shown) is disposed within the magnetic electrical connector 18. In some implementations, the first communication unit 53 and the third communication unit use at least one of the three exposed track power contacts 62 of the foldable track 14 to pass communication signals between the first communication unit 53 and the third communication unit. Optionally, the base unit controller 44 can verify, via the communication signals, whether the magnetic electrical connector 18 is authorized to receive power from the foldable power track 14. If the magnetic electrical connector 18 is not authorized to receive power from the foldable power track 14, the base unit controller 44 can turn off switch 46 to cease supplying power to the foldable power track 14.

Figure 33:
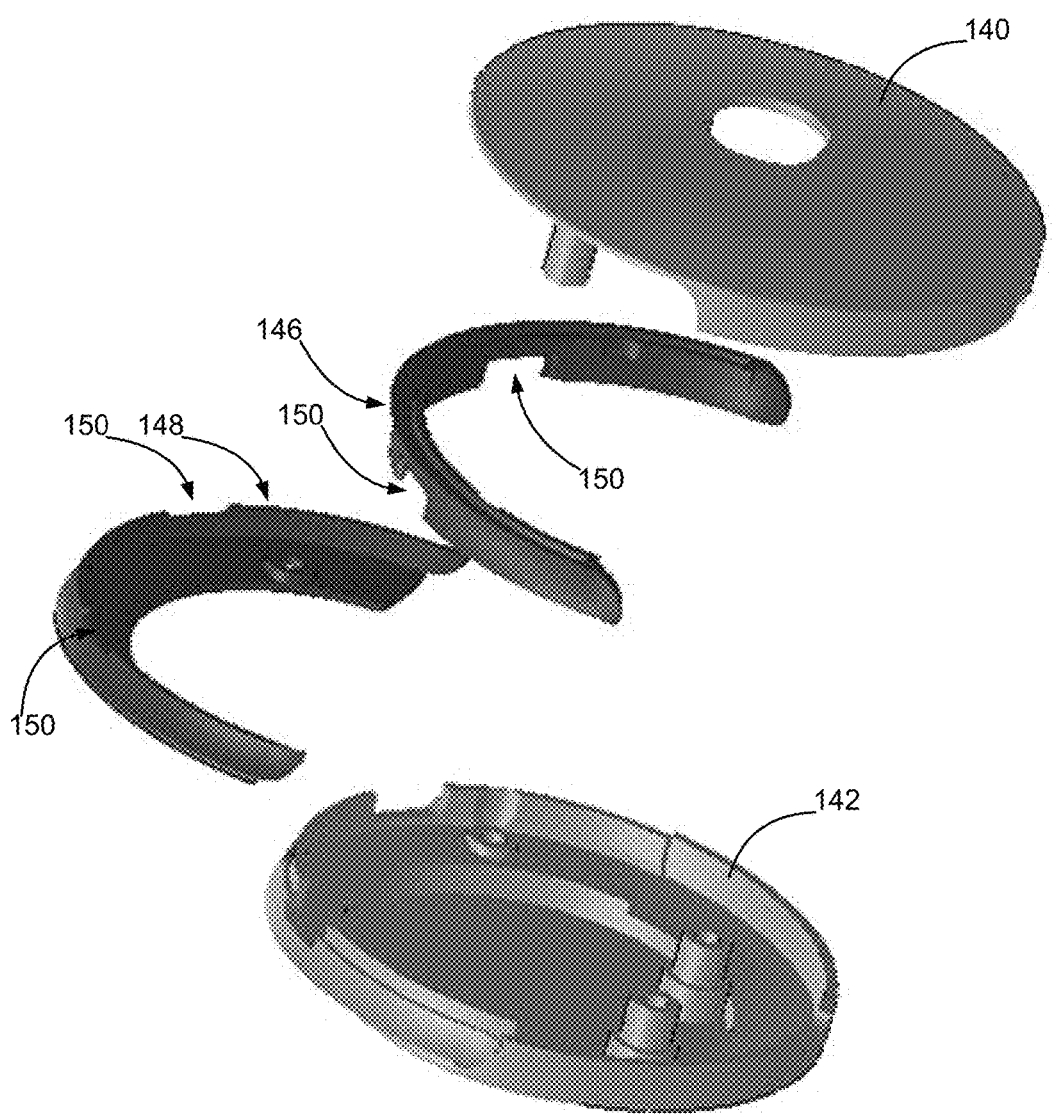
FIG. 33 is an exploded perspective view of an external shell of an example power distribution unit according to an implementation.
Figure 34:
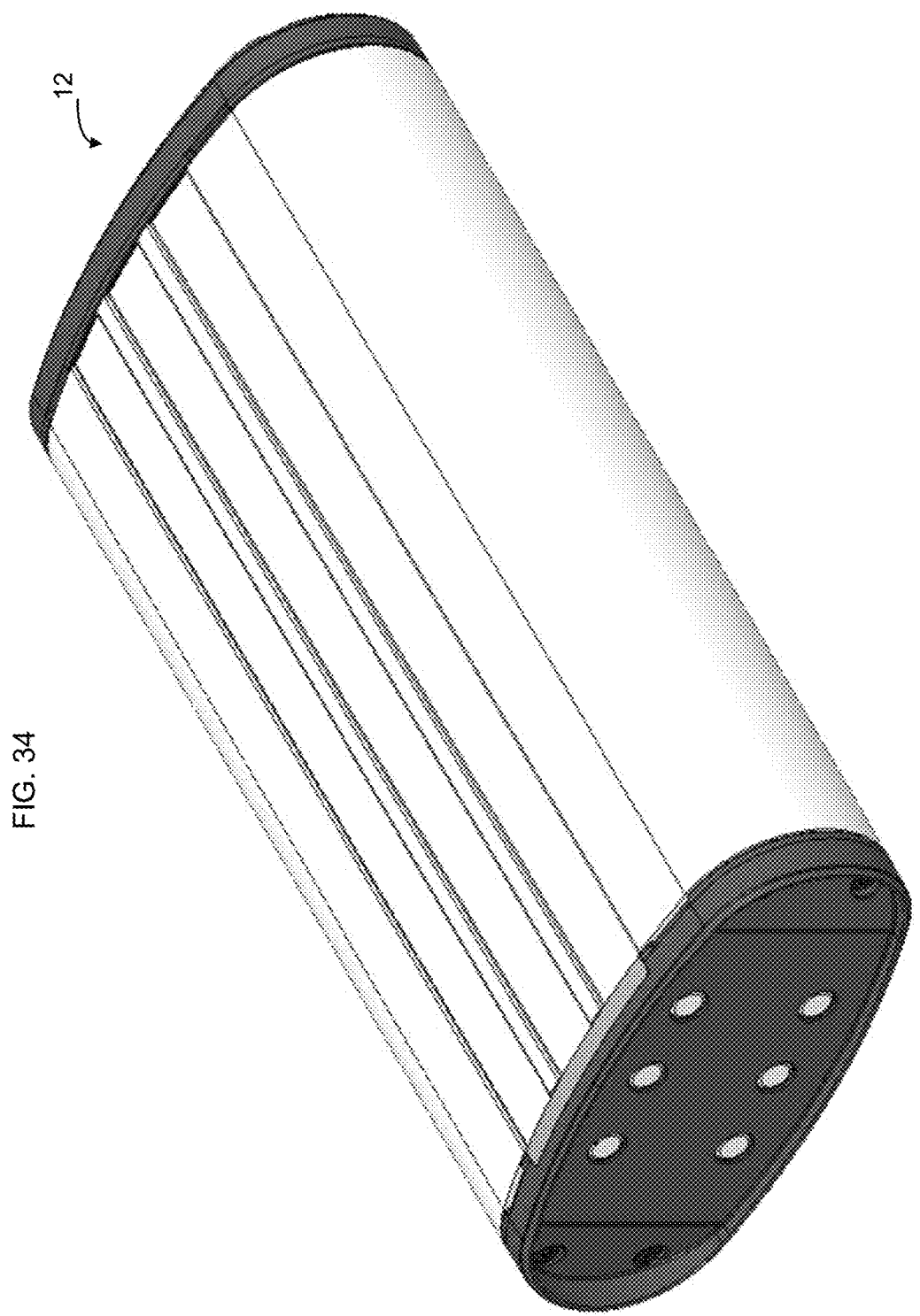
FIG. 34 is a front perspective view of a base unit according to an implementation.

FIG. 33 is a broken apart view showing constituent parts of an example power distribution unit 20. As shown in FIG. 33, the outside body of the power distribution unit 20 may be formed using a clamshell design, with a clamshell top 140 and clamshell bottom 142 that are screwed together using screws. Removable top and bottom front shields 146, 148, are provided in the area surrounding the ports 110. In some implementations, the front shields are removable without separating clamshell top 140 from clamshell bottom 142. In some implementations, shields 146 have apertures 150 sized to engage and retain specially designed electrical plugs (i.e. specially designed USB plug inserts) to hold the USB plugs in the ports 110 so that the USB plug cannot be removed from the port 110. In other embodiments the shields are configured to engage and retain power whips 124 to prevent the power whips from being removed from the power distribution unit 120.

Figure 35:
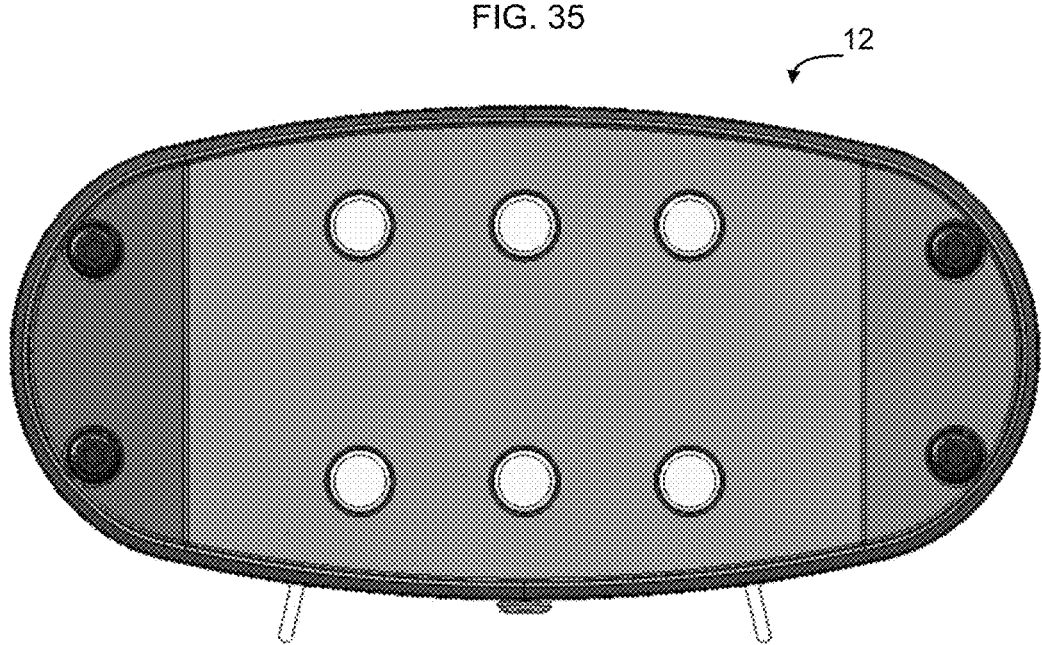
FIG. 35 is a front view of the base unit of FIG. 34.
Figure 36:
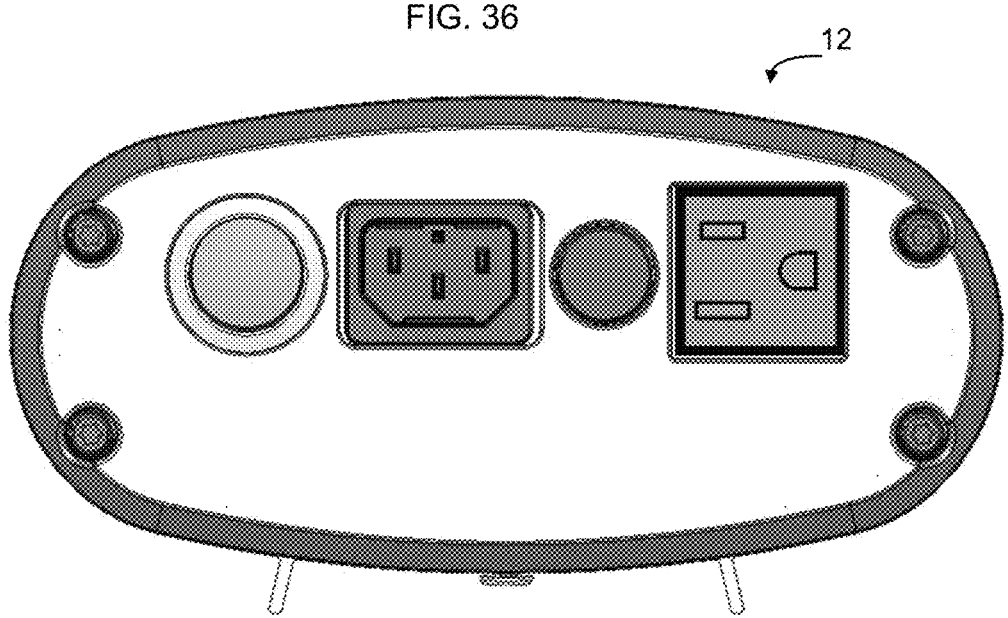
FIG. 36 is a rear view of the base unit of FIG. 34.
Figure 37:
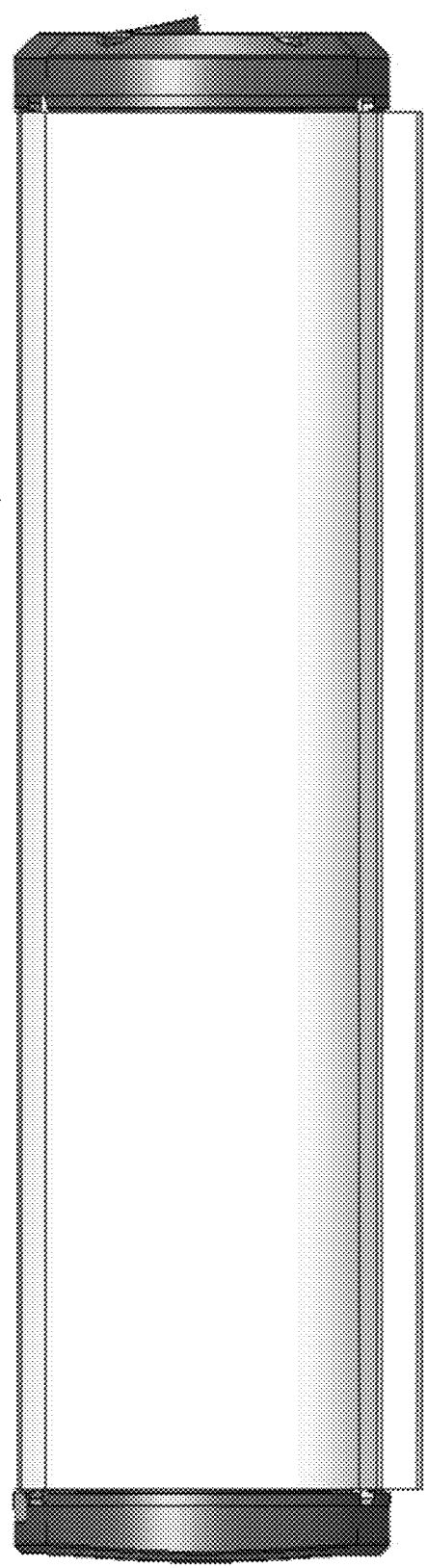
FIG. 37 is a right side view of the base unit of FIG. 34. The left side view of the base unit is a mirror image of the right side view.
Figure 38:
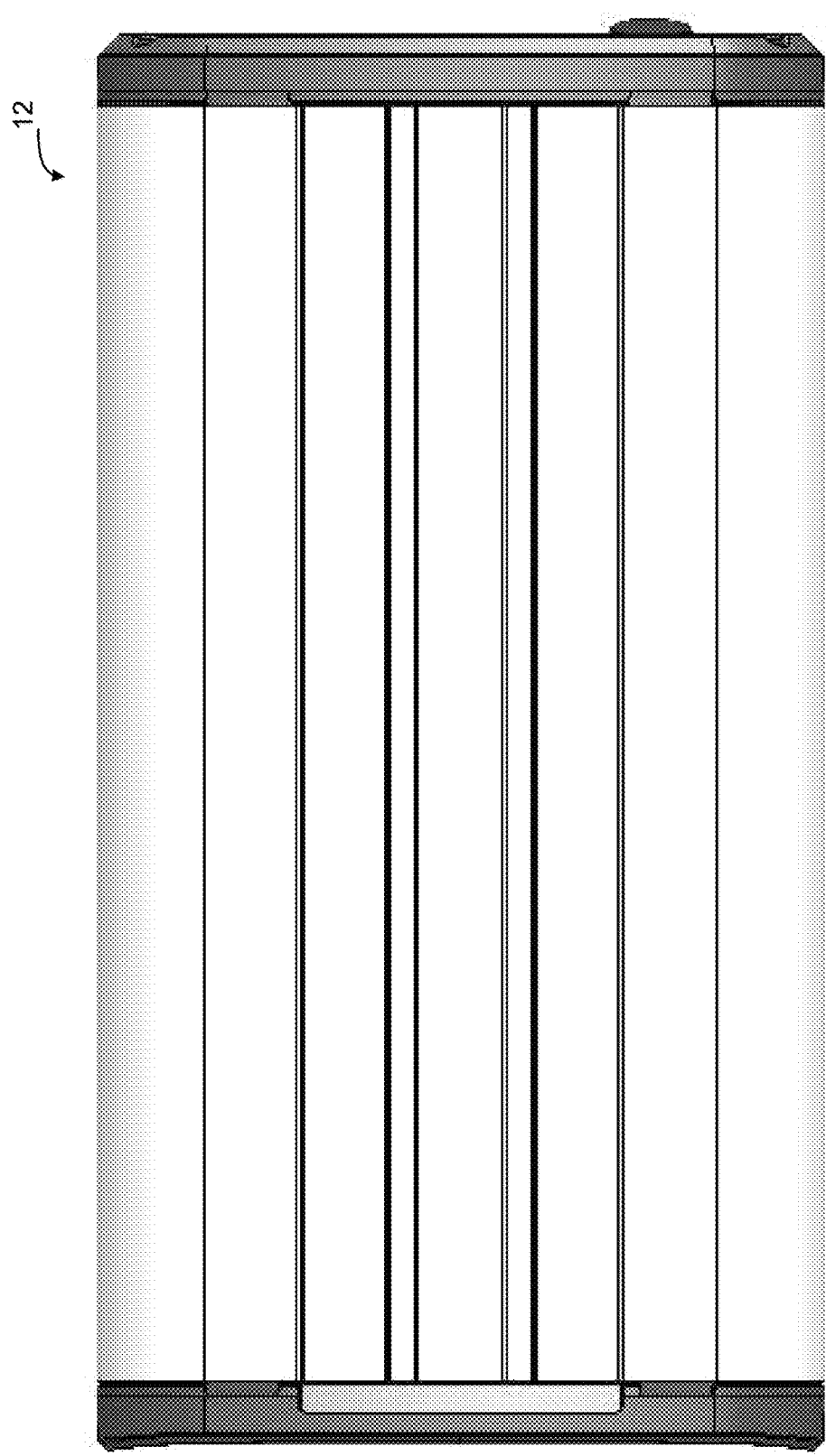
FIG. 38 is a top plan view of the base unit of FIG. 34.
Figure 39:
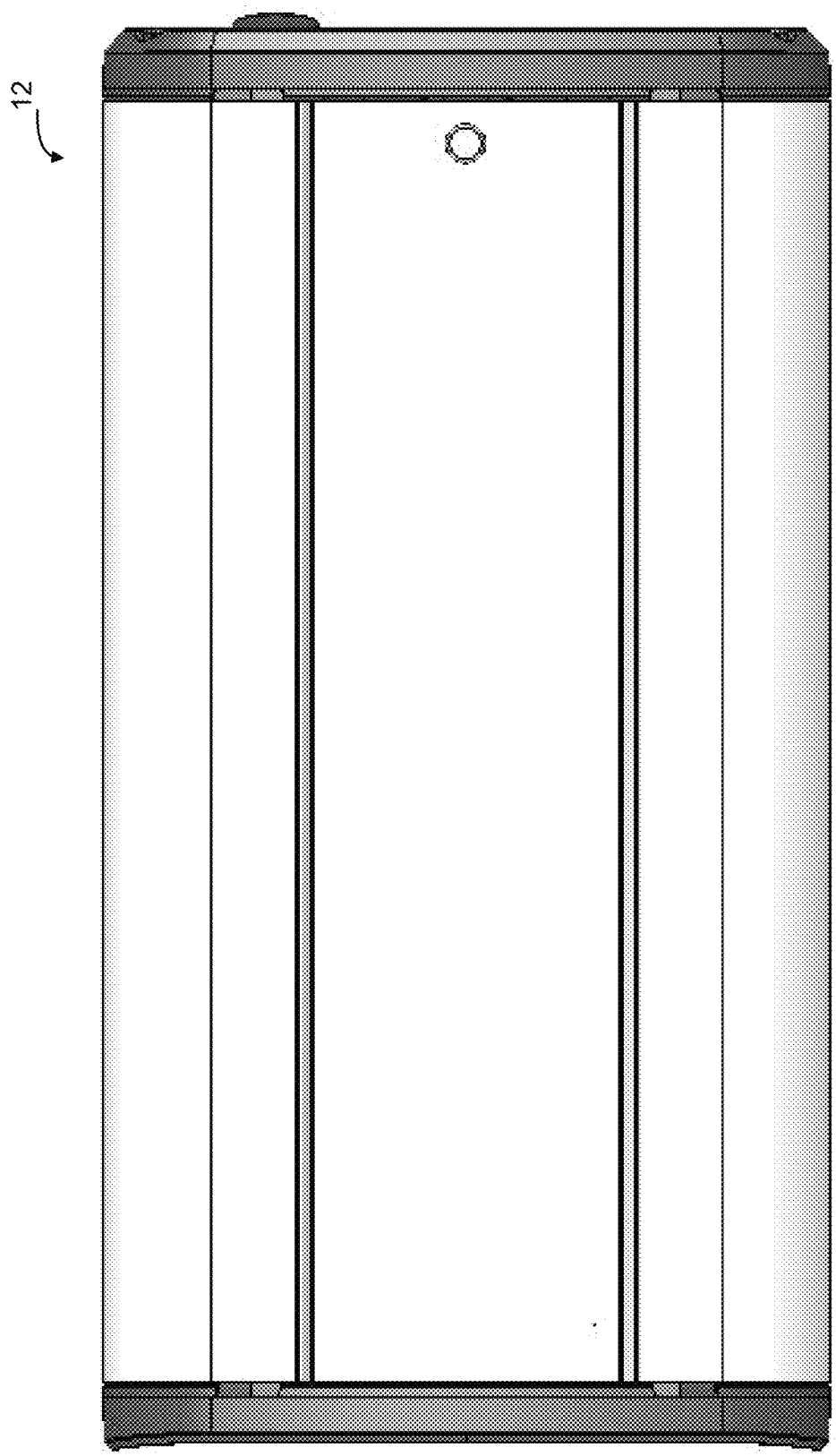
FIG. 39 is a bottom plan view of the base unit of FIG. 34.
Figure 40:
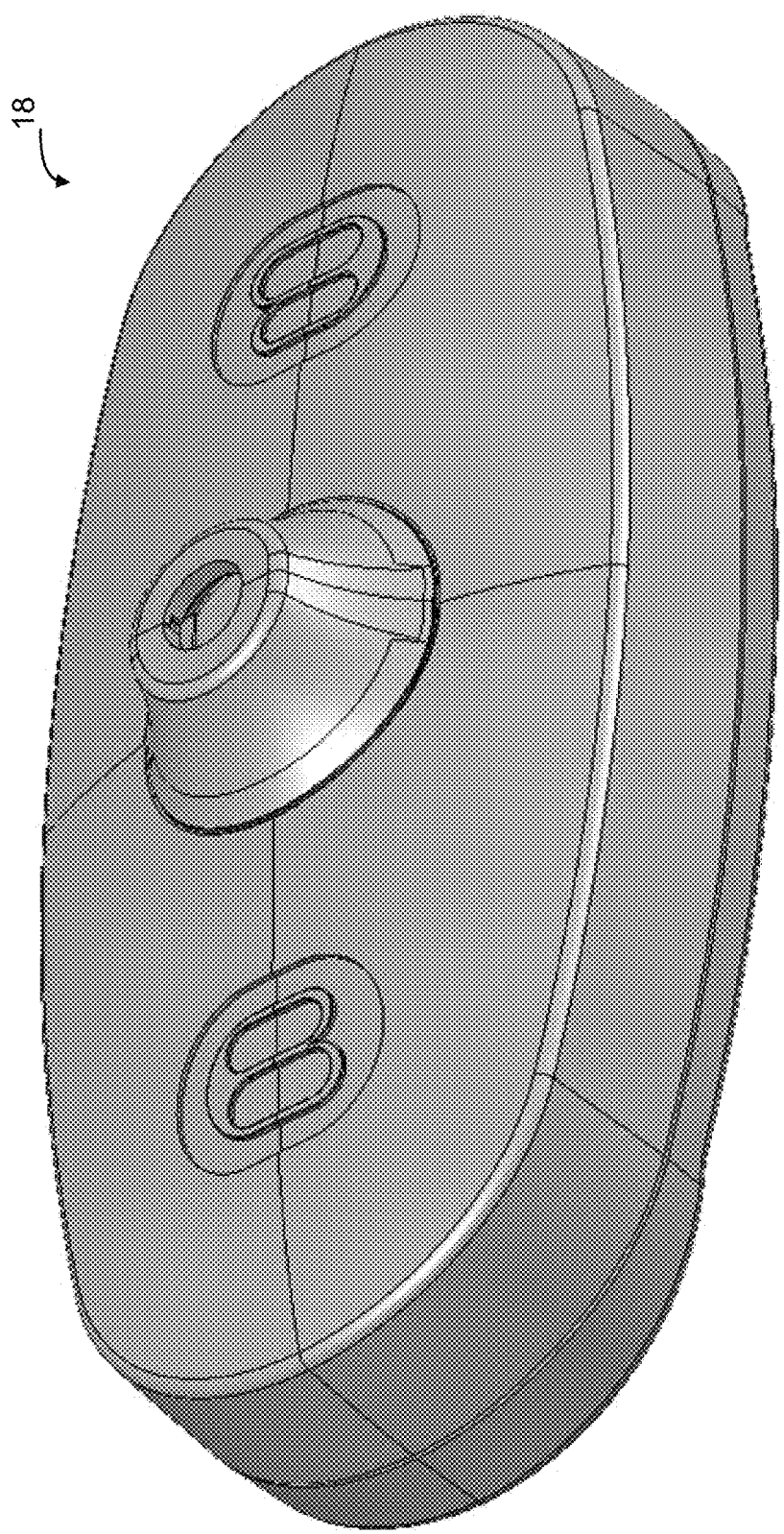
FIG. 40 is a top perspective view of a magnetic connector according to an implementation.

FIGS. 34-39 show a new and original design for an example base unit according to an implementation. In FIGS. 34-39, FIG. 34 is a front perspective view of the base unit. FIG. 35 is a front view of the base unit of FIG. 34. FIG. 36 is a rear view of the base unit of FIG. 34. FIG. 37 is a right side view of the base unit of FIG. 34. The left side view of the base unit is a mirror image of the right side view. FIG. 38 is a top plan view of the base unit of FIG. 34. FIG. 39 is a bottom plan view of the base unit of FIG. 34.

Figure 42:
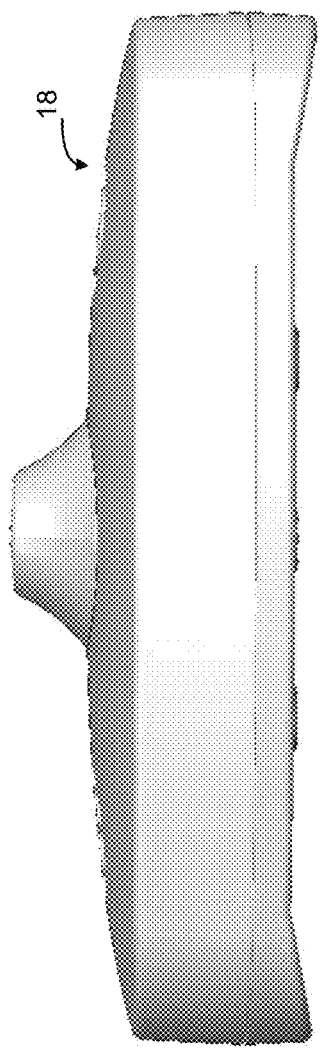
FIG. 42 is a front view of the magnetic connector of FIG. 40. The rear view of the base unit is a mirror image of the front view.
Figure 43:
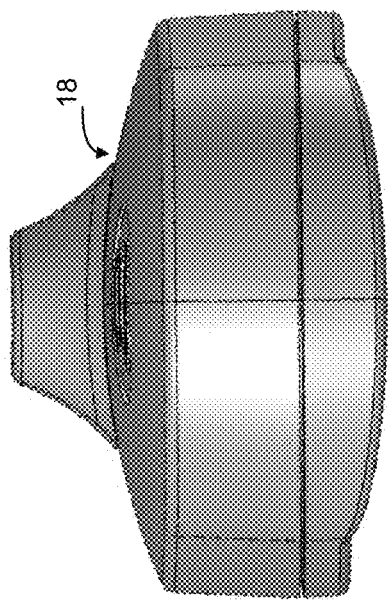
FIG. 43 is a right side view of the magnetic connector of FIG. 40. The left side view of the base unit is a mirror image of the right side view.
Figure 44:
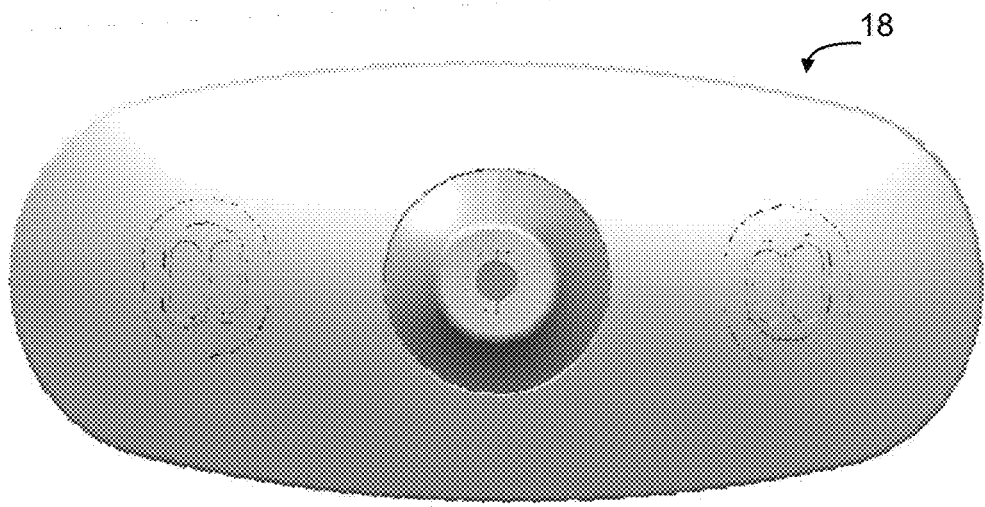
FIG. 44 is a top plan view of the magnetic connector of FIG. 40.
Figure 45:
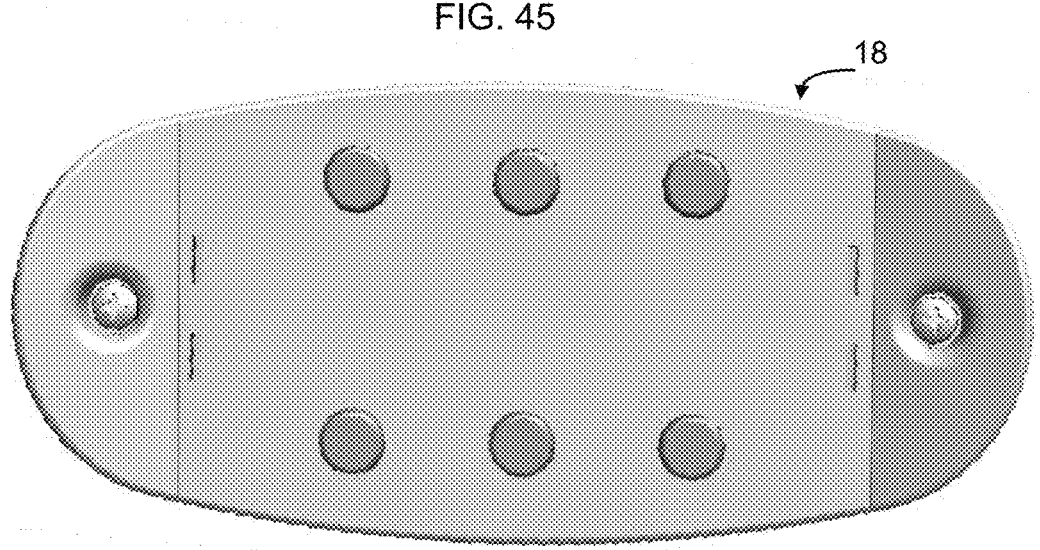
FIG. 45 is a bottom plan view of the magnetic connector of FIG. 40.
Figure 46:
FIG. 46 is a top perspective view of a power distribution unit according to an implementation.

FIGS. 40-45 show a new and original design for a magnetic connector according to an implementation. In FIGS. 40-45, FIG. 40 is a top perspective view of the magnetic connector. FIG. 41 is a bottom perspective view of the magnetic connector of FIG. 40. FIG. 42 is a front view of the magnetic connector of FIG. 40. The rear view of the base unit is a mirror image of the front view. FIG. 43 is a right side view of the magnetic connector of FIG. 40. The left side view of the base unit is a mirror image of the right side view. FIG. 44 is a top plan view of the magnetic connector of FIG. 40. FIG. 45 is a bottom plan view of the magnetic connector of FIG. 40.

Figure 47:
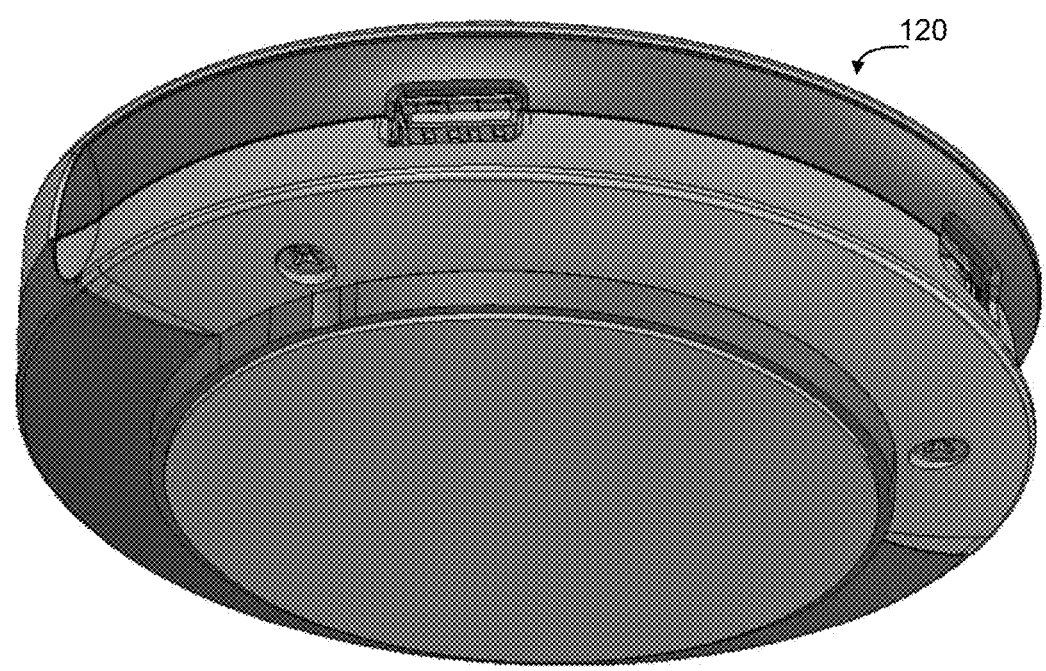
FIG. 47 is a bottom perspective view of the power distribution unit of FIG. 46.
Figure 48:
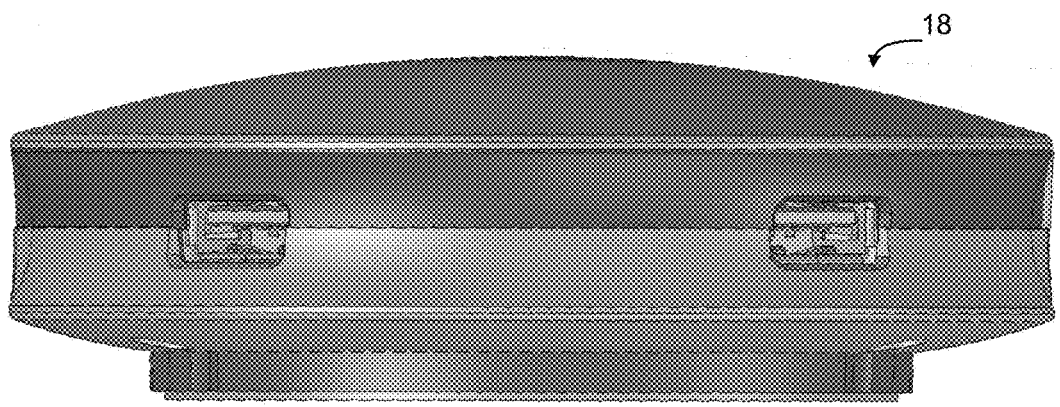
FIG. 48 is a front view of the power distribution unit of FIG. 46.
Figure 49:
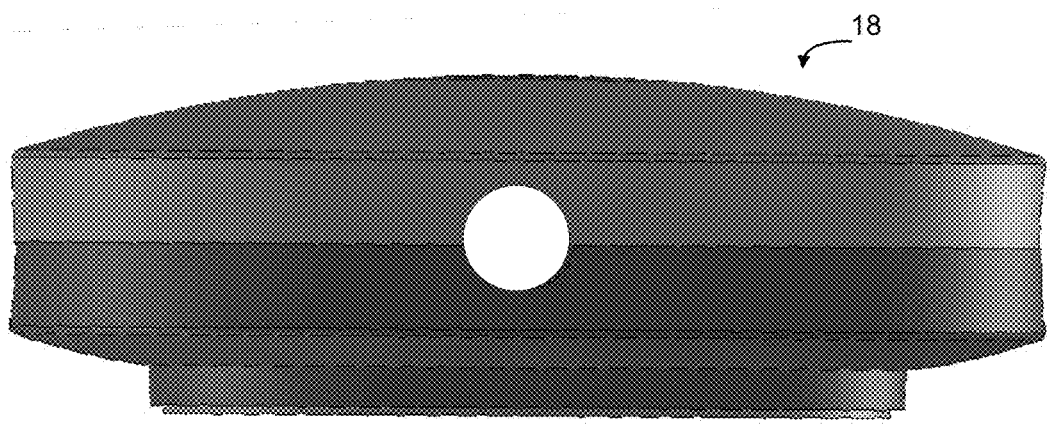
FIG. 49 is a rear view of the power distribution unit of FIG. 46.
Figure 50:
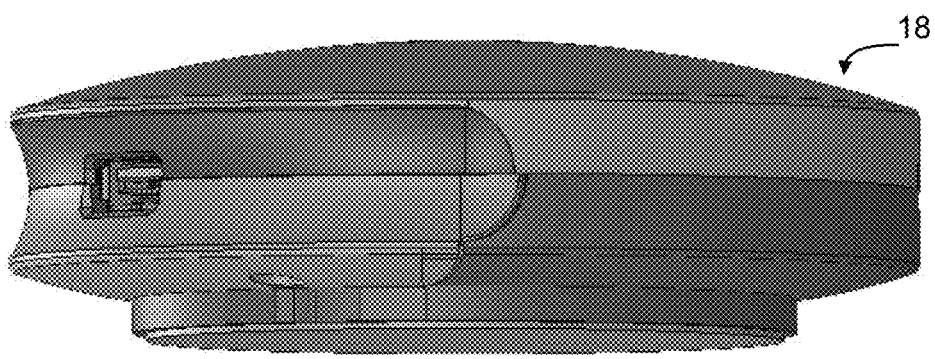
FIG. 50 is a right side view of the power distribution unit of FIG. 46. The left side view of the power distribution unit is a mirror image of the right side view.
Figure 51:
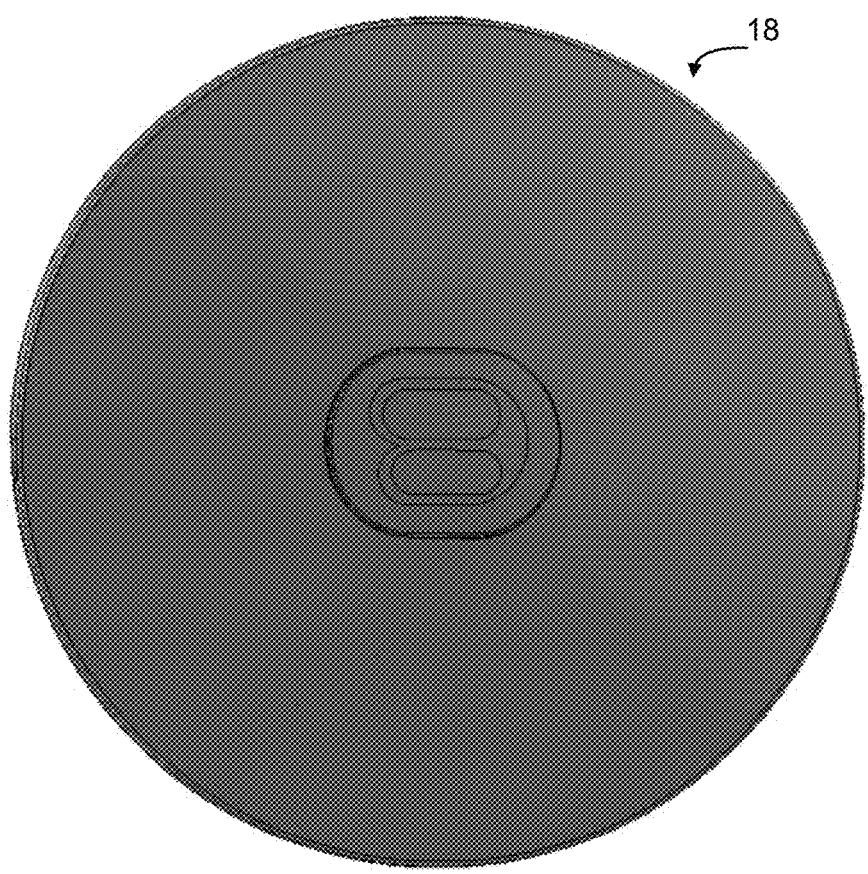
FIG. 51 is a top plan view of the power distribution unit of FIG. 46.
Figure 52:
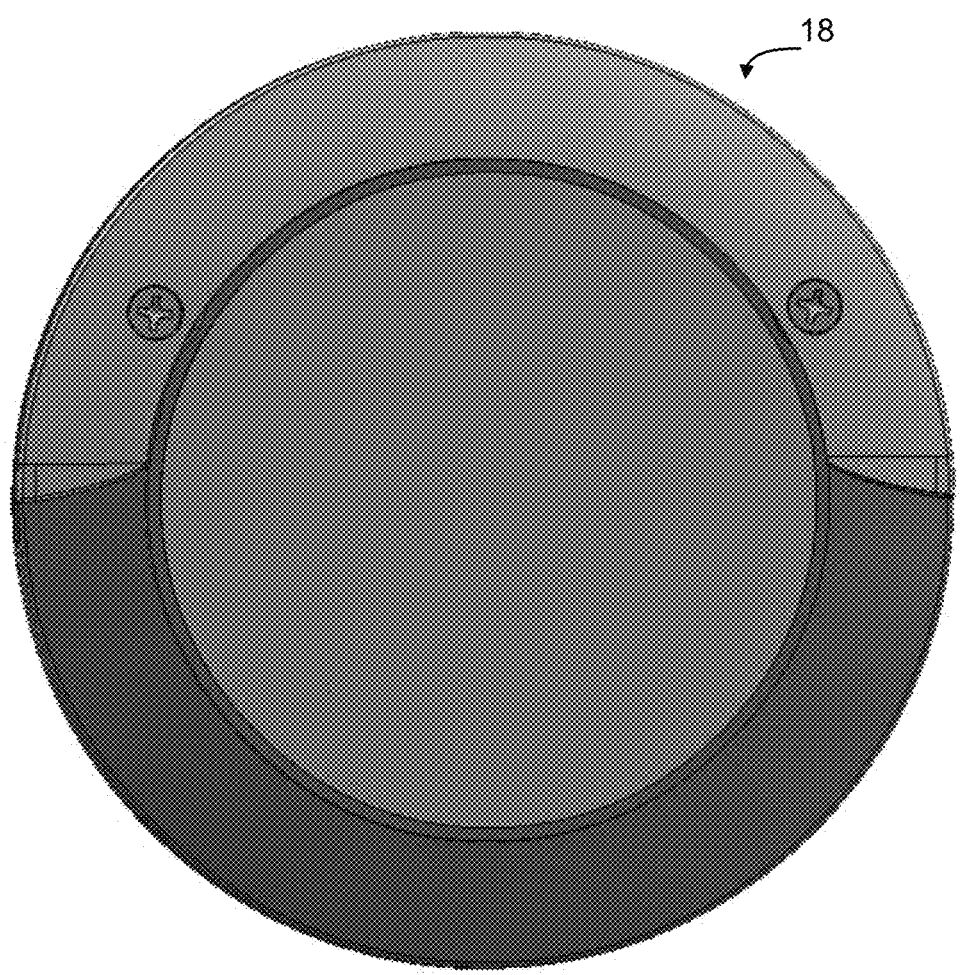
FIG. 52 is a bottom plan view of the power distribution unit of FIG. 46.

FIGS. 46-52 show a new and original design for power distribution according to an implementation. In FIGS. 46-52, FIG. 46 is a top perspective view of a power distribution unit. FIG. 47 is a bottom perspective view of the power distribution unit of FIG. 46. FIG. 48 is a front view of the power distribution unit of FIG. 46. FIG. 49 is a rear view of the power distribution unit of FIG. 46. FIG. 50 is a right side view of the power distribution unit of FIG. 46. The left side view of the power distribution unit is a mirror image of the right side view. FIG. 51 is a top plan view of the power distribution unit of FIG. 46. FIG. 52 is a bottom plan view of the power distribution unit of FIG. 46.

The following reference numerals are used in the drawings:

10 rapidly deployable floor power system
12 base unit
14 foldable power track
16 track power cable
17 track input terminal
18 magnetic connector
20 power distribution system
22 power distribution cable
24 power distribution unit
25 desk
26 power cord
28 rigid track section
30 flexible track connector
32 dual ended magnetic power cable
34 room
36 AC power input
38 GFI/fuse
40 AC power outlet
42 AC-DC transformer
44 controller
46 Switch
48 DC power output
50 power contact
52 magnetic attractor
53 communication unit
54 protection circuit
56 power conditioner
58 load sensor
60 LED
62 track power contact
64 magnetic attractors
66 wire 68 termination end
70 top surface
70 beveled edges
74 channel
76 magnetic attractor grooves
78 power contact grooves
80 power contact channels
82 rigid tail pieces
84 flexible ribbon
86 electrical connectors
88 brass tip
90 wire
92 tongue
94 wedge-shaped retaining clasps
95 strain relief member
96 region
98 legs
100 contact
101 aperture
102 printed circuit board
104 spring
106 base
112 lower surface
114 top interior surface
116 cavity
122 female low voltage DC output port
124 power whip
126 DC connector
128 DC power input
129 controller
130 first DC-DC converter
131 communication unit
132 first set of DC ports
134 second DC-DC converter
136 second set of DC ports
138 LED
140 clamshell top
142 clamshell bottom
146 top shield
148 bottom shield
150 aperture A number of implementations have been described. Nevertheless, it will be understood that additional modifications may be made without departing from the scope of the inventive concepts described herein, and, accordingly, other implementations are within the scope of the following claims.

What is claimed is:

1. A rapidly deployable floor power system, comprising:
a base unit for receiving mains power and outputting a DC voltage on a DC power output;
a foldable power track in electrical communication with the base unit to receive the DC voltage, the foldable power track having a plurality of rigid track sections interconnected by flexible track connectors; and
a power distribution system, the power distribution system having a first magnetic electrical connector on a first end of a power distribution cable to magnetically connect to the foldable power track to receive the DC voltage, the power distribution system further having a power distribution unit on a second end of the power distribution cable, the power distribution unit receiving the DC voltage via the power distribution cable and converting the DC voltage to a second DC voltage.

2. The rapidly deployable floor power system of claim 1, wherein the base unit has a protection circuit to prevent an overcurrent and/or overvoltage condition on the DC power output.

3. The rapidly deployable floor power system of claim 2, wherein each rigid track section of the foldable power track has a first profile including a flat top surface and beveled edges;
wherein the DC power output has a DC power output profile that matches the first profile; and
wherein the magnetic electrical connector has a second profile to mate with the first profile of both the foldable power track and the DC power output.

4. The rapidly deployable floor power system of claim 1, wherein each rigid track section of the foldable power track has a first profile including a lower surface, a flat top surface, and beveled edges that taper from the flat top surface to the lower surface.

5. The rapidly deployable floor power system of claim 4, further comprising channels, formed within the flat top surface, to receive exposed track power contacts at the flat top surface.

6. The rapidly deployable floor power system of claim 4, further comprising magnetic attractors disposed below the flat top surface to engage magnets within the magnetic connector.

7. The rapidly deployable floor power system of claim 1, wherein the base unit has a power conditioning circuit to prevent the DC voltage from being output on the DC power output if the magnetic connector is not in electrical communication with the foldable power track.

8. The rapidly deployable floor power system of claim 1, wherein the base unit supplies DC voltage on the DC power output at approximately 36V DC.

9. The rapidly deployable floor power system of claim 1, wherein each of the rigid track sections has a plurality of exposed track power contacts on a top surface.

10. The rapidly deployable floor power system of claim 9, wherein each of the plurality of exposed track power contacts extends substantially a length of the top surface of the rigid track section.

11. The rapidly deployable floor power system of claim 9, wherein the exposed track power contacts of a first of the rigid track sections are electrically connected through the flexible track connectors to exposed track power contacts of a second of the rigid track sections.

12. The rapidly deployable floor power system of claim 11, wherein the first rigid track section is connected by the flexible track connector to the second rigid track section.

13. The rapidly deployable floor power system of claim 11, wherein the flexible track connector contains wires disposed within the flexible track connector to electrically connect the exposed track power contacts of the first and second rigid track sections.

14. The rapidly deployable floor power system of claim 9, wherein each of the rigid track sections has three exposed track power contacts.

15. The rapidly deployable floor power system of claim 14, wherein a first of the three exposed track power contacts is electrically connected to a positive output terminal of the DC power output; and
wherein a second of the three exposed track power contacts is electrically connected to a ground output terminal of the DC power output.

16. The rapidly deployable floor power system of claim 15, wherein a third of the three exposed track power contacts is electrically connected to a ground output terminal of the DC power output.

17. The rapidly deployable floor power system of claim 15, wherein the base unit has a first communication unit, the power distribution unit has a second communication unit, and wherein at least one of the three exposed track power contacts is used to pass communication signals between the first communication unit and the second communication unit.

18. The rapidly deployable floor power system of claim 1, further comprising a track power cable, the track power cable being electrically connected on a first track power cable end to the foldable power track and being electrically connected on a second track power cable end to a second magnetic connector, the second magnetic connector having the same shape as the first magnetic connector.

19. The rapidly deployable floor power system of claim 18, wherein the track power cable is mechanically and electrically affixed on the first track power cable end to the foldable power track.

20. The rapidly deployable floor power system of claim 18, wherein the track power cable is connected to a third magnetic connector on the first track power cable end.

21. The rapidly deployable floor power system of claim 1, further comprising at least a second foldable power track, having a second track power in electrical communication with the first foldable power track.

22. The rapidly deployable floor power system of claim 1, wherein the magnetic electrical connector has three connectors that are not in a straight line.

23. The rapidly deployable floor power system of claim 1, wherein the magnetic electrical connector has at least three connectors formed in a straight line.

24. The rapidly deployable floor power system of claim 1, wherein the magnetic electrical connector has six connectors, a first set of three of the six connectors being in a first straight line and a second set of three of the six connectors being in a second straight line, the first straight line being parallel to the second straight line.

25. The rapidly deployable floor power system of claim 1, wherein the DC power output has exposed power contacts to mate with power contacts of the magnetic electrical connector.

26. The rapidly deployable floor power system of claim 25, wherein the DC power output has magnetic attractors spaced to engage magnets of the magnetic electrical connector.

27. The rapidly deployable floor power system of claim 1, wherein the magnetic electrical connector comprises:
  a plurality of magnets;
  a body having a lower exterior surface and a top shell defining an internal cavity;
  a printed circuit board disposed within the internal cavity;
  a plurality of contacts connected to the printed circuit board to extend through apertures in the lower surface; and
  a plurality of springs disposed within the cavity to bias the contacts away from the top interior surface of the cavity.

28. The rapidly deployable floor power system of claim 27, wherein when the magnetic electrical connector engages the foldable power track, the magnets of the magnetic electrical connector engage magnetic attractors of the foldable power track to pull the lower surface of the magnetic electrical connector into mating relationship with a profile of the foldable power track.

29. The rapidly deployable floor power system of claim 27, wherein when the magnetic electrical connector engages the foldable power track the plurality of contacts are pushed up into the body of the magnetic electrical connector against a biasing force of the springs.

30. The rapidly deployable floor power system of claim 1, wherein the power distribution unit comprises:
  a plurality of female low voltage DC output ports;
  a DC-DC transformer configured to convert DC power received at a DC power input to a first voltage level for presentation at the plurality of female low voltage DC output ports;
  a plurality of whips connected to the DC output ports;
  an external body formed as a top clamshell, a bottom clamshell, and a shield configured to retain the plurality of whips from being removed from the power distribution unit.

31. The rapidly deployable floor power system of claim 30, wherein each whip has a male plug that engages one of the DC output ports on a first end, and the shield holds the male plug in the respective port so that the plug cannot be removed from the port.

32. The rapidly deployable floor power system of claim 31, wherein each whip has a male DC connector on a second end to connect to a female port of an electronic device.

33. The rapidly deployable floor power system of claim 31, wherein shield has apertures sized to engage and retain electrical plug inserts to retain the male plugs in the respective ports.

34. A foldable floor power track, comprising:
  a first rigid track section having a first top surface with a first plurality of exposed DC power contacts extending substantially a length of the first track rigid section;
  a second rigid track section having a second top surface with a second plurality of exposed DC power contacts extending substantially a length of the second rigid track section; and
  at least one flexible connector electrically and mechanically interconnecting a first rigid track section to the second rigid track section;
  wherein corresponding members of the first plurality of exposed DC power contacts of the first rigid track section are electrically connected through the flexible connector to corresponding members of the second plurality of exposed DC power contacts of the second rigid track section.

35. The foldable power track of claim 34, wherein the flexible connector has a first rigid tail piece connected to the first rigid track section, a second rigid tail piece connected to the second rigid track section, and a flexible ribbon extending between the rigid tail pieces.

36. The foldable power track of claim 35, wherein the first rigid tail piece is mechanically connected to the first rigid track section by first wedges formed on first tongues that engage corresponding first openings of the first rigid track section; and
  wherein the second rigid tail piece is mechanically connected to the second rigid track section by second wedges formed on second tongues that engage corresponding second openings of the second rigid track section.

37. The foldable power track of claim 35, wherein the flexible ribbon has three jacketed electrical wires extending between the rigid tail pieces through the flexible ribbon, each electrical connector having a brass tip at each end of the respective jacketed wire to interconnect with the DC power contacts of the rigid track sections.

38. The foldable power track of claim 35, wherein the flexible ribbon is formed as a pliable sheet substantially the width of the top surface of each rigid track section.

39. The foldable power track of claim 38, wherein the flexible ribbon is molded Thermo-Plastic Urethane (TPU).

* * * * *